United States Patent
Ly et al.

(10) Patent No.: US 11,979,259 B2
(45) Date of Patent: May 7, 2024

(54) COHERENCE INDICATION FOR DEMODULATION REFERENCE SIGNAL BUNDLING

(71) Applicant: QUALCOMM Incorporated, San Diego, CA (US)

(72) Inventors: Hung Dinh Ly, San Diego, CA (US); Mostafa Khoshnevisan, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 311 days.

(21) Appl. No.: 17/644,206

(22) Filed: Dec. 14, 2021

(65) Prior Publication Data

US 2022/0231886 A1   Jul. 21, 2022

Related U.S. Application Data

(60) Provisional application No. 63/137,860, filed on Jan. 15, 2021.

(51) Int. Cl.
*H04W 88/00* (2009.01)
*H04L 5/00* (2006.01)
*H04L 25/02* (2006.01)
(Continued)

(52) U.S. Cl.
CPC ........ *H04L 25/0222* (2013.01); *H04L 5/0051* (2013.01); *H04W 72/0446* (2013.01); *H04W 72/21* (2023.01)

(58) Field of Classification Search
CPC ..... H04L 5/001; H04L 5/0023; H04L 5/0044; H04L 5/0051; H04L 5/0053;
(Continued)

(56) References Cited

U.S. PATENT DOCUMENTS 11,310,022 B2 * 4/2022 Manolakos ........... H04L 5/0091
11,310,088 B2 * 4/2022 Ly ....................... H04L 27/2613
(Continued)

OTHER PUBLICATIONS

China Telecom, [106-e-NR-R17-CovEnh-03] Summary of email discussion on joint channel estimation for PUSCH, 3GPP TSG RAN WG1 #106-e R1-21xxxxx, 74 pages, Aug. 2021.*
(Continued)

*Primary Examiner* — Frank Duong
(74) *Attorney, Agent, or Firm* — Arun Swain

(57) ABSTRACT

Various aspects of the present disclosure generally relate to wireless communication. In some aspects, a user equipment (UE) may receive a configuration that indicates to the UE to apply demodulation reference signal (DMRS) bundling to physical uplink shared channel (PUSCH) transmissions. The UE may maintain phase coherence across multiple PUSCH transmissions, to which the DMRS bundling is applied, to enable joint channel estimation across the multiple PUSCH transmissions. The UE may transmit, based at least in part on the configuration, uplink control information (UCI) that includes a coherence indication. The UE may multiplex the UCI with a PUSCH transmission of the multiple PUSCH transmissions to which the DMRS bundling is applied. The coherence indication may indicate whether the PUSCH transmission is coherent with one or more other PUSCH transmissions, of the multiple PUSCH transmissions, transmitted by the UE. Numerous other aspects are described.

30 Claims, 10 Drawing Sheets

(51) Int. Cl.
  *H04W 72/0446* (2023.01)
  *H04W 72/21* (2023.01)
(58) Field of Classification Search
  CPC ............... H04L 5/0094; H04L 25/0204; H04L 25/0222; H04L 25/0228; H04L 27/2613; H04L 27/26132; H04L 27/26136; H04W 72/0446; H04W 72/21; H04W 72/23
  See application file for complete search history.

(56) References Cited

U.S. PATENT DOCUMENTS

| | | | |
|---|---|---|---|
| 2021/0014095 A1 | 1/2021 | Ly et al. | |
| 2022/0104227 A1* | 3/2022 | Sridharan | H04W 72/1268 |

OTHER PUBLICATIONS

China Telecom: "Discussion on PUCCH Coverage Enhancements," 3GPP TSG RAN WG1 #103-e, R1-2007995, e-Meeting, Oct. 26-Nov. 13, 2020, Nov. 13, 2020 (Nov. 13, 2020), XP051939425, 3 pages, Retrieved from the Internet: URL: https://ftp.3gpp.org/tsg_ran/WG1_RL1/TSGR1_103-e/Docs/R1-2007995.zip R1-2007995.doc [Retrieved on Oct. 16, 2020] The Whole Document.
Interdigital Inc., "Pusch Coverage Enhancements", 3GPP Draft, 3GPP TSG RAN WG1 #103-e, R1-2009583, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Nov. 8, 2020 (Nov. 8, 2020), XP051952366, 19 Pages, Retrieved from the Internet: URL: https://ftp.3gpp.org/tsg_ran/WG1_RL1/TSGR1_103-e/Docs/R1-2009583.zip R1-2009583_103e_COVE_AI8821_PUSCHENH_UPDT2_CLEAN.docx [Retrieved on Nov. 8, 2020], Sections 1-3.
International Search Report and Written Opinion—PCT/US2021/072936—ISA/EPO—dated Mar. 25, 2022.

* cited by examiner

COHERENCE INDICATION FOR DEMODULATION REFERENCE SIGNAL BUNDLING

CROSS-REFERENCE TO RELATED APPLICATION

This Patent Application claims priority to U.S. Provisional Patent Application No. 63/137,860, filed on Jan. 15, 2021, entitled "COHERENCE INDICATION FOR DEMODULATION REFERENCE SIGNAL BUNDLING," and assigned to the assignee hereof. The disclosure of the prior Application is considered part of and is incorporated by reference into this Patent Application.

FIELD OF THE DISCLOSURE

Aspects of the present disclosure generally relate to wireless communication and specifically, to techniques and apparatuses for coherence indication for demodulation reference signal bundling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

In some examples, a base station may signal, to a UE, whether to enable demodulation reference signal (DMRS) bundling to physical uplink shared channel (PUSCH) transmissions. In some examples, the base station may indicate to the UE to apply DMRS bundling to PUSCH transmissions for which a set of conditions is satisfied. The set of conditions may relate to whether the UE is capable of maintaining phase coherence across the PUSCH transmissions, such as whether the PUSCH transmissions are transmitted using the same frequency resource allocation, are transmitted using the same transmit power, are transmitted using the same beam, or are transmitted contiguously in time, among other examples. However, in some scenarios, the base station cannot unambiguously determine whether the set of conditions for PUSCH DMRS bundling is satisfied. This may lead to communication errors, inaccurate channel estimation by the base station, or a failure by the base station to properly demodulate the PUSCH transmissions, among other examples.

SUMMARY

In some aspects, a method of wireless communication performed by a user equipment (UE) includes receiving a configuration that indicates to the UE to apply demodulation reference signal (DMRS) bundling to physical uplink shared channel (PUSCH) transmissions. The UE maintains phase coherence across multiple PUSCH transmissions, to which the DMRS bundling is applied, to enable joint channel estimation across the multiple PUSCH transmissions. The method may include transmitting, based at least in part on the configuration, uplink control information (UCI) that includes a coherence indication. The UCI is multiplexed with a PUSCH transmission of the multiple PUSCH transmissions to which the DMRS bundling is applied. The coherence indication indicates whether the PUSCH transmission is coherent with one or more other PUSCH transmissions, of the multiple PUSCH transmissions, transmitted by the UE.

In some aspects, a method of wireless communication performed by a base station includes transmitting a configuration that indicates to a UE to apply DMRS bundling to PUSCH transmissions. The UE maintains phase coherence across multiple PUSCH transmissions, to which the DMRS bundling is applied, to enable joint channel estimation by the base station across the multiple PUSCH transmissions. The method includes receiving, based at least in part on the configuration, UCI that includes a coherence indication. The UCI is multiplexed with a PUSCH transmission of the multiple PUSCH transmissions to which the DMRS bundling is applied. The coherence indication indicates whether the PUSCH transmission is coherent with one or more other PUSCH transmissions, of the multiple PUSCH transmissions, transmitted by the UE.

In some aspects, a UE for wireless communication includes at least one processor and at least one memory communicatively coupled with the at least one processor. The memory stores processor-readable code that is executable by the at least one processor. The processor-readable code is configured to cause the UE to receive a configuration that indicates to the UE to apply DMRS bundling to PUSCH transmissions. The UE to maintain phase coherence across multiple PUSCH transmissions, to which the DMRS bundling is applied, to enable joint channel estimation across the multiple PUSCH transmissions. The processor-readable code is configured to cause the UE to transmit, based at least in part on the configuration, UCI that includes a coherence indication. The processor-readable code is configured to cause the UE to multiplex the UCI with a PUSCH transmission of the multiple PUSCH transmissions to which the DMRS bundling is applied. The coherence indication indicates whether the PUSCH transmission is coherent with one or more other PUSCH transmissions, of the multiple PUSCH transmissions, transmitted by the UE.

In some aspects, a base station for wireless communication includes at least one processor and at least one memory communicatively coupled with the at least one processor. The memory stores processor-readable code that is executable by the at least one processor. The processor-readable code is configured to cause the base station to transmit a configuration that indicates to a UE to apply DMRS bundling to PUSCH transmissions. The UE maintains phase coherence across multiple PUSCH transmissions, to which the DMRS bundling is applied, to enable joint channel estimation by the base station across the multiple PUSCH transmissions. The processor-readable code is configured to cause the base station to receive, based at least in part on the configuration, UCI that includes a coherence indication. The UCI is multiplexed with a PUSCH transmission of the multiple PUSCH transmissions to which the DMRS bundling is applied. The coherence indication indicates whether the PUSCH transmission is coherent with one or more other PUSCH transmissions, of the multiple PUSCH transmissions, transmitted by the UE.

In some aspects, a non-transitory computer-readable medium storing a set of instructions for wireless communication includes one or more instructions that, when executed by one or more processors of a UE, cause the UE to receive a configuration that indicates to the UE to apply DMRS bundling to PUSCH transmissions. The UE maintains phase coherence across multiple PUSCH transmissions, to which the DMRS bundling is applied, to enable joint channel estimation across the multiple PUSCH transmissions. The one or more instructions, when executed by one or more processors of a UE, cause the UE to transmit, based at least in part on the configuration, UCI that includes a coherence indication. The UCI is multiplexed with a PUSCH transmission of the multiple PUSCH transmissions to which the DMRS bundling is applied. The coherence indication indicates whether the PUSCH transmission is coherent with one or more other PUSCH transmissions, of the multiple PUSCH transmissions, transmitted by the UE.

In some aspects, a non-transitory computer-readable medium storing a set of instructions for wireless communication includes one or more instructions that, when executed by one or more processors of a base station, cause the base station to transmit a configuration that indicates to a UE to apply DMRS bundling to PUSCH transmissions. The UE maintains phase coherence across multiple PUSCH transmissions, to which the DMRS bundling is applied, to enable joint channel estimation by the base station across the multiple PUSCH transmissions. The one or more instructions, when executed by one or more processors of a base station, cause the base station to receive, based at least in part on the configuration, UCI that includes a coherence indication. The UCI is multiplexed with a PUSCH transmission of the multiple PUSCH transmissions to which the DMRS bundling is applied. The coherence indication indicates whether the PUSCH transmission is coherent with one or more other PUSCH transmissions, of the multiple PUSCH transmissions, transmitted by the UE.

In some aspects, an apparatus for wireless communication includes means for receiving a configuration that indicates to the apparatus to apply DMRS bundling to PUSCH transmissions. The apparatus maintains phase coherence across multiple PUSCH transmissions, to which the DMRS bundling is applied, to enable joint channel estimation across the multiple PUSCH transmissions. The apparatus includes means for transmitting, based at least in part on the configuration, UCI that includes a coherence indication. The UCI is multiplexed with a PUSCH transmission of the multiple PUSCH transmissions to which the DMRS bundling is applied. The coherence indication indicates whether the PUSCH transmission is coherent with one or more other PUSCH transmissions, of the multiple PUSCH transmissions, transmitted by the apparatus.

In some aspects, an apparatus for wireless communication includes means for transmitting a configuration that indicates to a UE to apply DMRS bundling to PUSCH transmissions. The UE maintains phase coherence across multiple PUSCH transmissions, to which the DMRS bundling is applied, to enable joint channel estimation by the apparatus across the multiple PUSCH transmissions. The apparatus includes means for receiving, based at least in part on the configuration, UCI that includes a coherence indication. The UCI is multiplexed with a PUSCH transmission of the multiple PUSCH transmissions to which the DMRS bundling is applied. The coherence indication indicates whether the PUSCH transmission is coherent with one or more other PUSCH transmissions, of the multiple PUSCH transmissions, transmitted by the UE.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
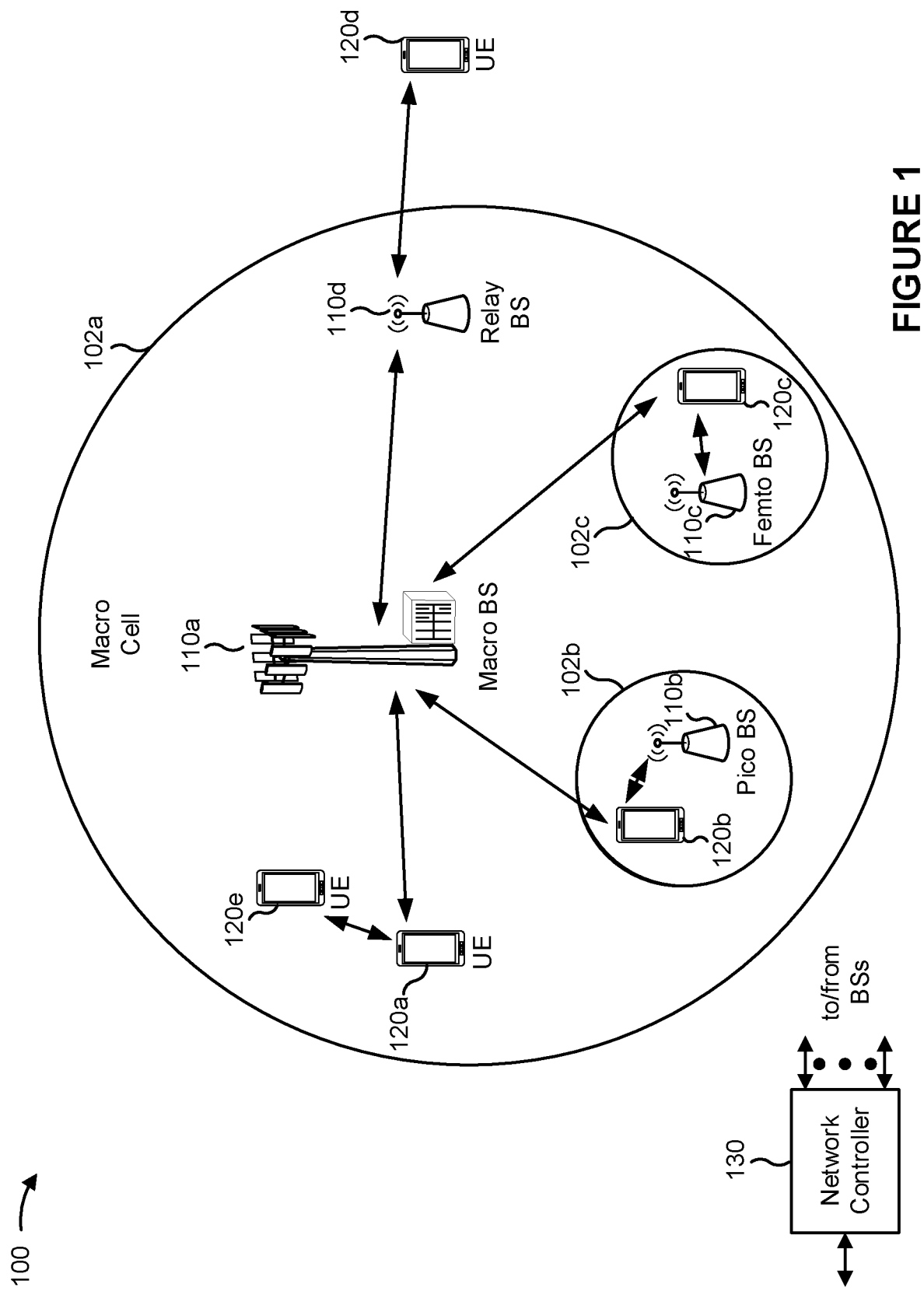
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to enabling a user equipment (UE) to indicate or control physical uplink shared channel (PUSCH) demodulation reference signal (DMRS) bundling using a coherence indication. Some aspects more specifically relate to UE transmission of a coherence indication for PUSCH DMRS bundling that indicates, to a base station, whether different PUSCH transmissions are phase coherent with (or have phase continuity with) one another. In some aspects, the UE may transmit the coherence indication for a PUSCH transmission (for example, in each PUSCH transmission) in uplink control information (UCI) that is multiplexed with the PUSCH transmission, which enables implicit indication of the PUSCH transmission to which the coherence indication applies.

Particular aspects of the subject matter described in this disclosure can be implemented to realize one or more of the following potential advantages. In some examples, the described techniques can be used to provide an unambiguous indication of whether different PUSCH transmissions are phase coherent with one another. As a result, the base station can correctly determine when to perform joint channel estimation for a PUSCH transmission (or multiple PUSCH transmissions) using multiple DMRSs, thereby improving the accuracy of channel estimation, reducing communication errors, and improving demodulation of the PUSCH transmission (or the multiple PUSCH transmissions).

FIG. 1 is a diagram illustrating an example of a wireless network in accordance with the present disclosure. The wireless network may be or may include elements of a 5G (NR) network or an LTE network, among other examples. The wireless network may include one or more base stations 110 (shown as BS 110a, BS 110b, BS 110c, and BS 110d) and other network entities. A base station (BS) is an entity that communicates with user equipments (UEs) and may also be referred to as an NR BS, a Node B, a gNB, a 5G node B (NB), an access point, or a transmit receive point (TRP), among other examples. Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, such as macro BSs, pico BSs, femto BSs, or relay BSs. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces, such as a direct physical connection or a virtual network, using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay, among other examples.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components or memory components, among other examples.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol or a vehicle-to-infrastructure (V2I) protocol), a mesh network, or a combination thereof. In such examples, the UE 120 may perform scheduling operations, resource selection operations, or other operations described elsewhere herein as being performed by the base station 110.

Devices of the wireless network may communicate using the electromagnetic spectrum, which may be subdivided based on frequency or wavelength into various classes, bands, or channels. For example, devices of the wireless network may communicate using an operating band having a first frequency range (FR1), which may span from 410 MHz to 7.125 GHz. As another example, devices of the wireless network may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" may broadly represent frequencies less than 6 GHz, frequencies within FR1, mid-band frequencies (for example, greater than 7.125 GHz), or a combination thereof. Similarly, unless specifically stated otherwise, it should be understood that the term "millimeter wave" may broadly represent frequencies within the EHF band, frequencies within FR2, mid-band frequencies (for example, less than 24.25 GHz), or a combination thereof. The frequencies included in FR1 and FR2 may be modified, and techniques described herein are applicable to those modified frequency ranges.

Figure 2:
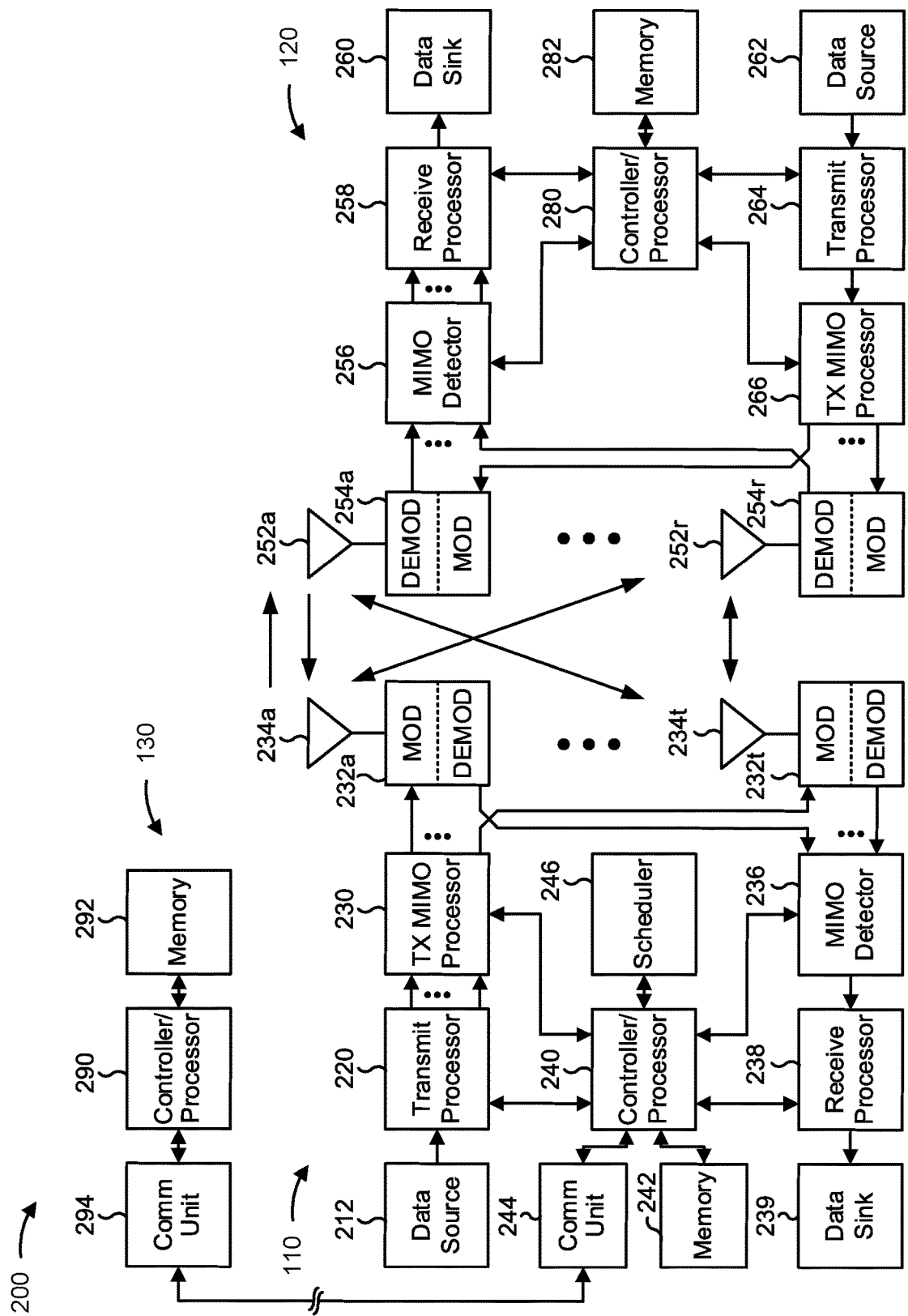
FIG. 2 is a diagram illustrating an example base station (BS) in communication with a user equipment (UE) in a wireless network in accordance with the present disclosure.

FIG. 2 is a diagram illustrating an example base station in communication with a UE in a wireless network in accordance with the present disclosure. The base station may correspond to base station 110 of FIG. 1. Similarly, the UE may correspond to UE 120 of FIG. 1.

Base station 110 may be equipped with T antennas 234a through 234t, and UE 120 may be equipped with R antennas 252a through 252r, where in general T≥1 and R≥1. At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling) and provide overhead symbols and control symbols. Transmit processor 220 may also generate reference symbols for reference signals and synchronization signals. A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. The term "controller/processor" may refer to one or more controllers, one or more processors (e.g., at least one processor), or a combination of one or more controllers and one or more processors. A channel processor may determine one or more of a reference signal received power (RSRP) parameter, a received signal strength indicator (RSSI) parameter, a reference signal received quality (RSRQ) parameter, or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (such as antennas 234a through 234t or antennas 252a through 252r) may include, or may be included within, one or more antenna panels, antenna groups, sets of antenna elements, or antenna arrays, among other examples. An antenna panel, an antenna group, a set of antenna elements, or an antenna array may include one or more antenna elements. An antenna panel, an antenna group, a set of antenna elements, or an antenna array may include a set of coplanar antenna elements or a set of non-coplanar antenna elements. An antenna panel, an antenna group, a set of antenna elements, or an antenna array may include antenna elements within a single housing or antenna elements within multiple housings. An antenna panel, an antenna group, a set of antenna elements, or an antenna array may include one or more antenna elements coupled to one or more transmission or reception components, such as one or more components of FIG. 2.

On the uplink, at UE 120, a transmit processor 264 may receive and process data from a data source 262 as well as control information (for example, for reports including RSRP, RSSI, RSRQ, or CQI) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM) or orthogonal frequency division multiplexing (OFDM) with a cyclic prefix (CP) (CP-OFDM)), and transmitted to base station 110. In some aspects, a modulator and a demodulator (for example, MOD/DEMOD 254) of the UE 120 may be included in a modem of the UE 120. In some aspects, the UE 120 includes a transceiver. The transceiver may include any combination of antenna(s) 252, modulators 254, demodulators 254, MIMO detector 256, receive processor 258, transmit processor 264, or TX MIMO processor 266. The transceiver may be used by a processor (for example, controller/processor 280) and memory 282 (e.g., at least one memory) to perform aspects of any of the methods described herein.

At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and uplink communications. In some aspects, a modulator and a demodulator (for example, MOD/DEMOD 232) of the base station 110 may be included in a modem of the base station 110. In some aspects, the base station 110 includes a transceiver. The transceiver may include any combination of antenna(s) 234, modulators 232, demodulators 232, MIMO detector 236, receive processor 238, transmit processor 220, or TX MIMO processor 230. The transceiver may be used by a processor (for example, controller/processor 240) and memory 242 (e.g., at least one memory) to perform aspects of any of the methods described herein.

Controller/processor 240 of base station 110, controller/processor 280 of UE 120, or any other component(s) of FIG. 2 may perform one or more techniques associated with coherence indication for demodulation reference signal (DMRS) bundling, as described in more detail elsewhere herein. For example, controller/processor 240 of base station 110, controller/processor 280 of UE 120, or any other component(s) of FIG. 2 may perform or direct operations of, for example, process 700 of FIG. 7, process 800 of FIG. 8, or other processes as described herein. Memories 242 and 282 (e.g., at least one memory) may store data and program codes for base station 110 and UE 120, respectively. In some aspects, memory 242 or memory 282 (e.g., at least one memory) may include a non-transitory computer-readable medium storing one or more instructions (for example, code, program code, and/or processor-readable code) for wireless communication. For example, the one or more instructions, when executed (for example, directly, or after compiling, converting, or interpreting) by one or more processors (e.g., at least one processor) of the base station 110 or the UE 120, may cause the one or more processors, the UE 120, or the base station 110 to perform or direct operations of, for example, process 700 of FIG. 7, process 800 of FIG. 8, or other processes as described herein. In some aspects, executing instructions may include running the instructions, converting the instructions, compiling the instructions, or interpreting the instructions, among other examples. The one or more instructions stored in the memory 242 may be configured to cause the base station 110 to perform operations described herein when the one or more instructions are executed by at least one processor of the base station 110. Similarly, the one or more instructions stored in the memory 282 may be configured to cause the UE 120 to perform operations described herein when the one or more instructions are executed by at least one processor of the UE 120.

In some aspects, the UE includes means for receiving a configuration that indicates to the UE to apply DMRS bundling to PUSCH transmissions, wherein the UE maintains phase coherence across multiple PUSCH transmissions, to which the DMRS bundling is applied, to enable joint channel estimation across the multiple PUSCH transmissions; or means for transmitting, based at least in part on the configuration, UCI that includes a coherence indication, wherein the UCI is multiplexed with a PUSCH transmission of the multiple PUSCH transmissions to which the DMRS bundling is applied, and wherein the coherence indication indicates whether the PUSCH transmission is coherent with one or more other PUSCH transmissions, of the multiple PUSCH transmissions, transmitted by the UE. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for receiving an indication that defines the time window. In some aspects, the UE includes means for transmitting an indication of a capability of the UE to support transmission of the coherence indication for the DMRS bundling. In some aspects, the UE includes means for receiving an instruction to transmit the coherence indication for the DMRS bundling.

In some aspects, the base station includes means for transmitting a configuration that indicates to a UE to apply DMRS bundling to PUSCH transmissions, wherein the UE maintains phase coherence across multiple PUSCH transmissions, to which the DMRS bundling is applied, to enable joint channel estimation by the base station across the multiple PUSCH transmissions; or means for receiving, based at least in part on the configuration, UCI that includes a coherence indication, wherein the UCI is multiplexed with a PUSCH transmission of the multiple PUSCH transmissions to which the DMRS bundling is applied, and wherein the coherence indication indicates whether the PUSCH transmission is coherent with one or more other PUSCH transmissions, of the multiple PUSCH transmissions, transmitted by the UE. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for performing joint channel estimation for the PUSCH transmission and the one or more other PUSCH transmissions based at least in part on the coherence indication. In some aspects, the base station includes means for performing separate channel estimation for the PUSCH transmission based at least in part on the coherence indication. In some aspects, the base station includes means for determining whether to perform joint channel estimation or separate channel estimation for the PUSCH transmission based at least in part on the coherence indication. In some aspects, the base station includes means for transmitting an indication that defines the time window. In some aspects, the base station includes means for receiving an indication of a capability of the UE to support transmission of the coherence indication for the DMRS bundling. In some aspects, the base station includes means for transmitting an instruction to transmit the coherence indication for the DMRS bundling.

Figure 3:
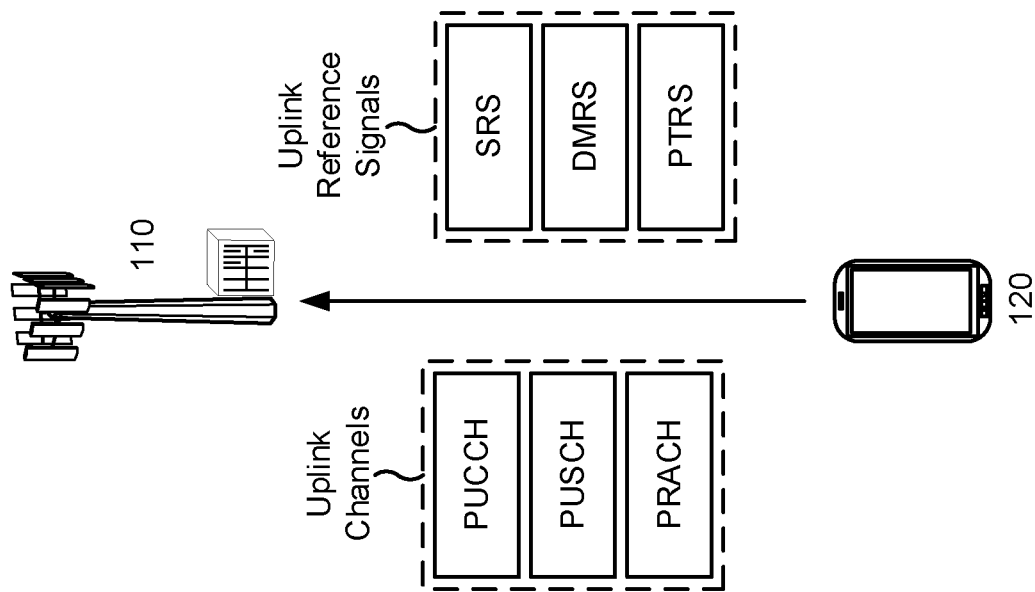
FIG. 3 is a diagram illustrating an example of physical channels and reference signals in a wireless network in accordance with the present disclosure.
Figure 3:
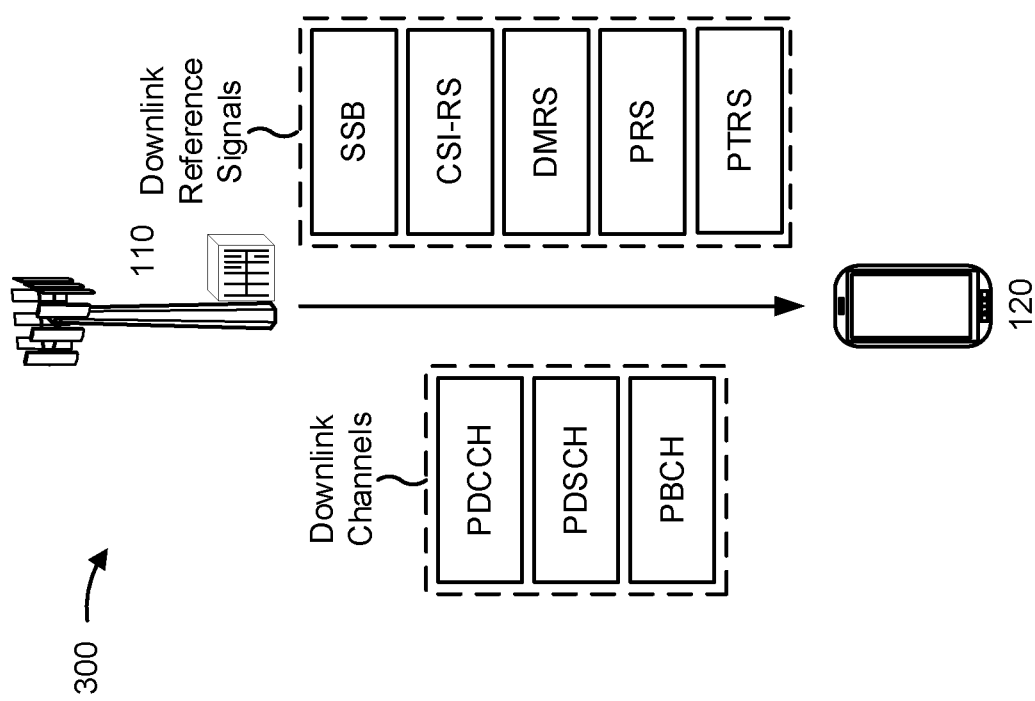

FIG. 3 is a diagram illustrating an example 300 of physical channels and reference signals in a wireless network in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (for example, ACK/NACK feedback or ACK/NACK information) in UCI on the PUCCH or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (for example, downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (for example, in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a quantity of transmission layers (for example, a rank), a precoding matrix (for example, a precoder), a modulation and coding scheme (MCS), or a refined downlink beam (for example, using a beam refinement procedure or a beam management procedure), among other examples.

A DMRS may carry information used to estimate a radio channel for demodulation of an associated physical channel (for example, PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (for example, rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (for example, on the PDSCH) and uplink communications (for example, on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (for example, a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (for example, a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

Figure 4:
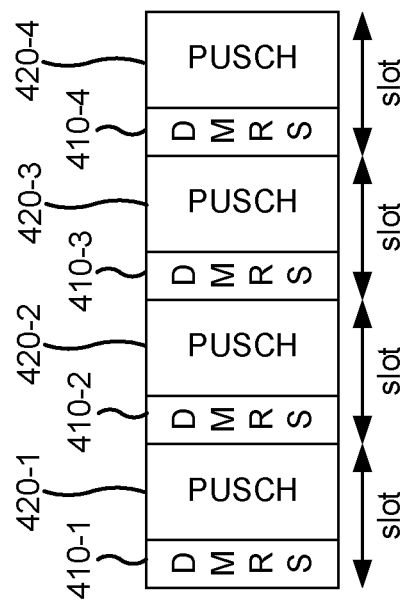
FIG. 4 is a diagram illustrating an example of demodulation reference signal (DMRS) bundling in accordance with the present disclosure.

FIG. 4 is a diagram illustrating an example 400 of DMRS bundling in accordance with the present disclosure. A DMRS for a PUSCH (sometimes called a PUSCH DMRS) may carry information used to estimate a radio channel for demodulation of a PUSCH transmission on the PUSCH. The design and mapping of a PUSCH DMRS may be specific to the PUSCH, for which the DMRS is used for estimation.

When DMRS bundling is not performed, a base station may perform separate channel estimation for different PUSCH transmissions. For example, without DMRS bundling, a base station may perform channel estimation (sometimes called slot-specific channel estimation) for demodulation of a PUSCH transmission using only a DMRS corresponding to that PUSCH transmission (for example, without using any other DMRSs). In some examples, the DMRS corresponding to a PUSCH transmission may be a DMRS that is transmitted in the same time domain resource (for example, the same slot or the same mini-slot) as the PUSCH transmission. Thus, DMRS transmission without DMRS bundling may be referred to as slot-specific DMRS transmission.

Referring to FIG. 4, when DMRS bundling is not performed, the base station may perform separate channel estimation for a first PUSCH transmission 420-1 by using only a first DMRS 410-1 (and by not using any of a second DMRS 410-2, a third DMRS 410-3, or a fourth DMRS 410-4) to estimate the PUSCH for demodulation of the first PUSCH transmission 420-1. As shown, the first DMRS 410-1 and the first PUSCH transmission 420-1 occur in the same slot. Similarly, the base station may perform separate channel estimation for a second PUSCH transmission 420-2 by using only the second DMRS 410-2 to estimate the PUSCH for demodulation of the second PUSCH transmission 420-2, may perform separate channel estimation for a third PUSCH transmission 420-3 by using only the third DMRS 410-3 to estimate the PUSCH for demodulation of the third PUSCH transmission 420-3, and may perform separate channel estimation for a fourth PUSCH transmission 420-4 by using only the fourth DMRS 410-4 to estimate the PUSCH for demodulation of the fourth PUSCH transmission 420-4.

To improve channel estimation, the base station may indicate to (for example, may instruct) a UE to apply (or perform) DMRS bundling for the PUSCH (sometimes called PUSCH DMRS bundling). When DMRS bundling is applied or performed, the base station may perform joint channel estimation (sometimes called coherent channel estimation or cross-slot channel estimation) for different PUSCH transmissions, which improves the accuracy of channel estimation, thereby improving performance. For example, with DMRS bundling, the base station may perform channel estimation for demodulation of a PUSCH transmission using multiple DMRSs corresponding to multiple PUSCH transmissions (for example, the PUSCH transmission being demodulated and one or more other PUSCH transmissions). In some examples, at least one of the DMRSs, used for channel estimation for the PUSCH transmission, is transmitted in a different time domain resource (for example, a different slot or a different mini-slot) as the PUSCH transmission. Thus, DMRS transmission with DMRS bundling may be referred to as cross-slot DMRS transmission.

Referring to FIG. 4, when DMRS bundling is performed, the base station may perform joint channel estimation for the first PUSCH transmission 420-1 using the first DMRS 410-1 and using at least one of the second DMRS 410-2, the third DMRS 410-3, or the fourth DMRS 410-4 to estimate the PUSCH for demodulation of the first PUSCH transmission 420-1. The base station may perform joint channel estimation for the second, third, or fourth PUSCH transmission in a similar manner, such as by using a corresponding DMRS and one or more other DMRSs. Different ones of the first, second, third, and fourth PUSCH transmissions may be different repetitions of the same PUSCH transmission (for example, over multiple slots for PUSCH repetition type A or in the same slot for PUSCH repetition type B), or may be different PUSCH transmissions that carry different transport blocks.

To enable accurate joint estimation of a PUSCH transmission using multiple DMRSs, the multiple DMRSs (and the corresponding PUSCH transmissions) need to be phase coherent with one another. Phase coherence is also sometimes referred to as phase continuity. Thus, when a UE performs DMRS bundling for multiple PUSCH transmissions, the UE must maintain phase coherence (or phase continuity) across the multiple PUSCH transmissions (for example, across the PUSCH symbols in which the PUSCH transmissions are transmitted) to enable the base station to obtain an accurate joint channel estimation for the multiple PUSCH transmissions. In some examples, a first PUSCH transmission and a second PUSCH transmission have phase coherence or have phase continuity if the starting phase of a radio wave for the second PUSCH transmission is the same as the ending phase of a radio wave for the first PUSCH transmission. For example, a first PUSCH transmission and a second PUSCH transmission would have phase coherence or phase continuity if the phase difference between a first radio wave, of the first PUSCH transmission, and a second radio wave, of the second PUSCH transmission, is constant. Conversely, a first PUSCH transmission and a second PUSCH transmission would not have phase coherence or phase continuity if the phase difference between a first radio wave, of the first PUSCH transmission, and a second radio wave, of the second PUSCH transmission, changes or is random.

Some changes to transmission parameters between two PUSCH transmissions result in phase discontinuity (a lack of phase coherence) between those two PUSCH transmissions. For example, if the UE uses different frequency resource allocations between the two PUSCH transmissions, uses a different transmit power for the two PUSCH transmissions, or uses different uplink beams to transmit the two PUSCH transmissions, among other examples, then the two PUSCH transmissions may not be phase coherent with one another. As another example, if the two PUSCH transmissions are non-contiguous in a time resource allocation, then the two PUSCH transmissions may not be phase coherent with one another in some examples. For example, if there is a large (for example, greater than a threshold) time gap between the two PUSCH transmissions, then the two PUSCH transmissions may not be phase coherent with one another. For example, another uplink transmission (on another channel, such as a PUCCH transmission, or another reference signal, such as an SRS) may be transmitted between the two PUSCH transmissions (for example, in the time gap), causing the two PUSCH transmissions to not be phase coherent with one another. As another example, a downlink transmission (for example, a PDCCH transmission, a PDSCH transmission, an SSB, or a CSI-RS) may be received between the two PUSCH transmissions, causing the two PUSCH transmissions to not be phase coherent with one another.

In some examples, a base station may signal, to a UE, whether to enable DMRS bundling to PUSCH transmissions (sometimes called PUSCH DMRS bundling), such as using a radio resource control (RRC) message, DCI, or a medium access control (MAC) control element (CE) (collectively, MAC-CE). In some examples, the base station may indicate to the UE to apply DMRS bundling to PUSCH transmissions for which a set of conditions (for example, one or more conditions) is satisfied. The set of conditions may relate to whether the UE is capable of maintaining phase coherence across the PUSCH transmissions, such as whether the PUSCH transmissions are transmitted using the same frequency resource allocation, are transmitted using the same transmit power, are transmitted using the same beam, or are transmitted contiguously in time (or within a threshold amount of time, or without other intervening uplink transmissions or downlink receptions), among other examples. If both the UE and the base station are capable of unambiguously determining whether the set of conditions is satisfied, then enabling DMRS bundling via base station signaling can be used for the UE to determine when to apply PUSCH DMRS bundling and for the base station to determine when to perform joint channel estimation of the PUSCH using bundled DMRSs, and for those determinations to be unambiguously applied to the same DMRSs and corresponding PUSCH transmissions.

However, in some scenarios, the base station cannot unambiguously determine whether the set of conditions for PUSCH DMRS bundling is satisfied. For example, the UE determines a transmit power for uplink power control based at least in part on a pathloss reference signal (PL-RS) measured by the UE. If a pathloss value determined by the UE (based at least in part on the PL-RS) changes between two PUSCH transmissions, then the UE may transmit those two PUSCH transmissions using different transmit powers. However, the base station may not receive information indicating a change to the PL-RS measurement by the UE, the pathloss value determined by the UE, or the change to transmit power used by the UE. As a result, the base station may assume that the two PUSCH transmissions are phase coherent (and transmitted using the same transmit power) when the two PUSCH transmissions are actually not phase coherent (because the two PUSCH transmissions are transmitted using different transmit powers). This may lead to communication errors, inaccurate channel estimation by the base station, or a failure by the base station to properly demodulate the PUSCH transmissions, among other examples. As another example, the UE may transmit one or more uplink transmissions (for example, to another base station) between two PUSCH transmissions, may receive one or more downlink transmissions (for example, from the other base station) between the two PUSCH transmissions, or may transmit or receive one or more sidelink communications (for example, from another UE) between the two PUSCH transmissions, which may interrupt the phase continuity between the two PUSCH transmissions. The base station may not receive information indicating such intervening communications and resulting phase discontinuity between the two PUSCH transmissions and may incorrectly assume phase coherence between the two PUSCH transmissions, leading to errors and inefficiencies as indicated above.

Various aspects relate generally to enabling a UE to indicate or control PUSCH DMRS bundling using a coherence indication. Some aspects more specifically relate to UE transmission of a coherence indication for PUSCH DMRS bundling that indicates, to a base station, whether different PUSCH transmissions are phase coherent with one another. In some aspects, the UE may transmit the coherence indication for a PUSCH transmission in UCI that is multiplexed with the PUSCH transmission, which enables implicit indication of the PUSCH transmission to which the coherence indication applies. In some aspects, the coherence indication is a single bit to conserve network resource overhead or memory resources.

Particular aspects of the subject matter described in this disclosure can be implemented to realize one or more of the following potential advantages. In some examples, the described techniques can be used to provide an unambiguous indication of whether different PUSCH transmissions are phase coherent with one another. As a result, the base station can correctly determine when to perform joint channel estimation for a PUSCH transmission using multiple DMRSs, thereby improving the accuracy of channel estimation, reducing communication errors, and improving demodulation of the PUSCH transmission.

Figure 5:
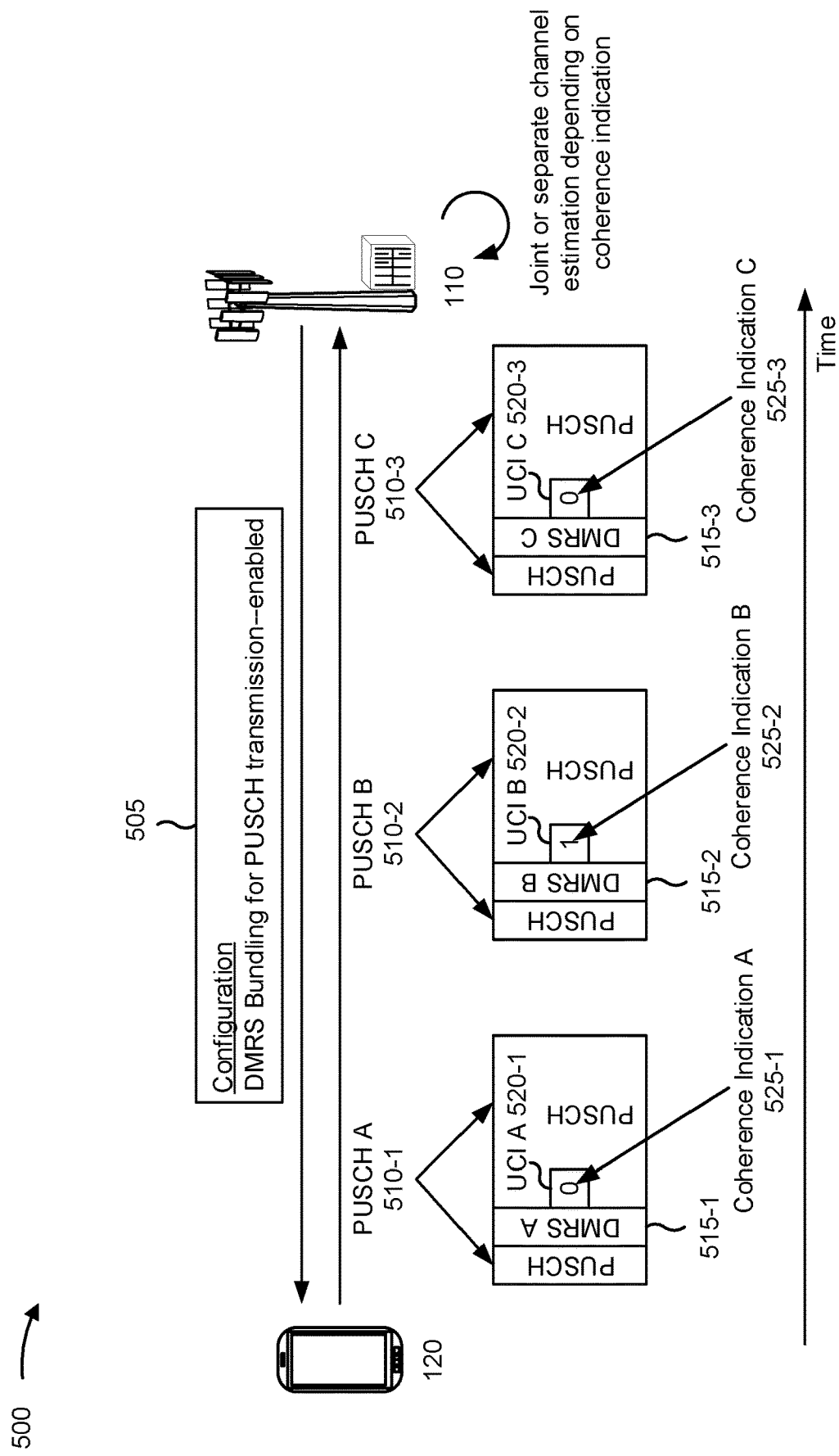
FIGS. 5 and 6 are diagrams illustrating examples associated with coherence indication for DMRS bundling in accordance with the present disclosure.

FIG. 5 is a diagram illustrating an example 500 associated with coherence indication for DMRS bundling in accordance with the present disclosure. As shown in FIG. 5, a base station 110 and a UE 120 may communicate with one another.

As shown in FIG. 5, the base station 110 may transmit a configuration 505 to the UE 120. The configuration 505 may indicate to the UE 120 to apply DMRS bundling to PUSCH transmissions (sometimes called PUSCH DMRS bundling). For example, the configuration 505 may indicate that PUSCH DMRS bundling is enabled for the UE 120. In some aspects, the UE 120 may transmit a capability report indicating that the UE 120 is capable of PUSCH DMRS bundling, and the UE 120 may receive the configuration 505 based at least in part on the capability report. Additionally or alternatively, the UE 120 may transmit a capability report indicating that the UE 120 is capable of supporting transmission of a coherence indication for PUSCH DMRS bundling (described in more detail below), and the UE 120 may receive the configuration 505 based at least in part on the capability report. In some aspects, the UE 120 may receive the configuration 505 in an RRC message, such as an RRC configuration message or an RRC reconfiguration message. If DMRS bundling is applied to a set of PUSCH transmissions, then the UE must maintain phase coherence (or phase continuity) across the set of PUSCH transmissions to enable the base station 110 to perform joint channel estimation across the set of PUSCH transmissions, as described in more detail above in connection with FIG. 4. Additional details of PUSCH DMRS bundling are also described above in connection with FIG. 4.

As further shown in FIG. 5, the UE 120 may transmit multiple PUSCH transmissions 510 to the base station 110 over time (in different time domain resources, such as slots, mini-slots, or symbols), shown as a first PUSCH transmission 510-1 ("PUSCH A"), a second PUSCH transmission 510-2 ("PUSCH B"), and a third PUSCH transmission 510-3 ("PUSCH C"). Although three PUSCH transmissions 510 are shown in FIG. 5, aspects may include a different quantity of PUSCH transmissions 510. As further shown, each PUSCH transmission 510 may be associated with a DMRS 515, shown as a first DMRS 515-1 ("DMRS A") corresponding to PUSCH A, a second DMRS 515-2 ("DMRS B") corresponding to PUSCH B, and a third DMRS 515-3 ("DMRS C") corresponding to PUSCH C. In example 500, a DMRS 515 and a corresponding PUSCH transmission 510 are transmitted in the same slot, with the DMRS 515 being transmitted in a subset of resource elements of that slot (such as according to a DMRS configuration). For example, DMRS A and PUSCH A are transmitted in a first slot, DMRS B and PUSCH B are transmitted in a second slot, and DMRS C and PUSCH C are transmitted in a third slot.

As shown, the UE 120 may transmit UCI 520 in connection with each PUSCH transmission 510, shown as first UCI 520-1 ("UCI A") corresponding to PUSCH A, second UCI 520-2 ("UCI B") corresponding to PUSCH B, and third UCI 520-3 ("UCI C") corresponding to PUSCH C. In some aspects, the UCI 520 is multiplexed with a PUSCH transmission 510 to which the UCI 520 relates (for example, a PUSCH transmission 510 to which the information carried in the UCI 520 applies). For example, the PUSCH transmission 510 may be rate-matched around the UCI 520 in some aspects. In some other aspects, the PUSCH transmission 510 may be punctured with the UCI 520.

As shown, the UCI 520 may include a coherence indication 525, shown as a first coherence indication 525-1 ("Coherence Indication A") included in UCI A, a second coherence indication 525-2 ("Coherence Indication B") included in UCI B, and a third coherence indication 525-3 ("Coherence Indication C") included in UCI C. A coherence indication 525 may indicate whether a PUSCH transmission 510, corresponding to the coherence indication 525, is coherent with (for example, has phase coherence with) one or more other PUSCH transmissions. The PUSCH transmission 510 corresponding to the coherence indication 525 is sometimes referred to herein as a "primary PUSCH transmission," and the one or more other PUSCH transmissions are sometimes referred to herein as "secondary PUSCH transmission(s)." Thus, the coherence indication 525 may indicate whether a primary PUSCH transmission (transmitted in connection with and relating to the UCI 520 that includes the coherence indication 525) has phase coherence with one or more secondary PUSCH transmissions (other than the primary PUSCH transmission). The coherence indication may also be called a "bundling indication." In some aspects, the primary PUSCH transmission and the secondary PUSCH transmission(s) are different PUSCH transmissions that carry different transport blocks (TBs). Additionally or alternatively, the primary PUSCH transmission and the secondary PUSCH transmission(s) may be different repetitions of a particular PUSCH transmission (for example, carrying the same TB). In some aspects, the UE 120 may transmit a coherence indication based at least in part on reporting, in a capability report, that the UE 120 supports coherence indication for PUSCH DMRS bundling. Additionally or alternatively, the UE 120 may receive, from the base station 110, an instruction (for example, in a configuration, an RRC message, DCI, or a MAC-CE) to transmit a coherence indication for PUSCH DMRS bundling, and the UE 120 may transmit the coherence indication based at least in part on the instruction.

The coherence indication may include one or more bits that indicate the secondary PUSCH transmission with which the primary PUSCH transmission is coherent. In some aspects, the coherence indication consists of only a single bit to conserve signaling overhead. In this example, a first value of the bit (for example, 1) may indicate that the primary PUSCH transmission has phase continuity with one or more secondary PUSCH transmissions, and a second value of the bit (for example, 0) may indicate that the primary PUSCH transmission does not have phase continuity with the one or more secondary PUSCH transmissions.

An indication of the particular secondary PUSCH transmission(s) to which the coherence indication applies may be stored in memory of the UE 120 (for example, based at least in part on a wireless communication standard) or may be signaled to the UE 120 by the base station 110 (for example, in the configuration, in DCI, or in a MAC-CE). In some aspects, the coherence indication applies to a single PUSCH transmission that immediately precedes the primary PUSCH transmission in the time domain. For example, the coherence indication may apply to a previous PUSCH transmission that occurs before (for example, immediately before) the primary PUSCH transmission (for example, in a prior PUSCH occasion that precedes the primary PUSCH transmission without any intervening PUSCH transmissions by the UE 120). In this example, when the coherence indication is a single bit, a first value of the single bit may indicate that the primary PUSCH transmission is coherent with the prior PUSCH transmission, and a second value of the bit may indicate that the primary PUSCH transmission is not coherent with the prior PUSCH transmission. When the coherence indication applies to PUSCH transmission(s) that occur before the primary PUSCH transmission, this improves flexibility for the UE 120 (as compared to when the coherence indication applies to PUSCH transmission(s) that occur after the primary PUSCH transmission) because the UE 120 does not need to commit to maintaining phase continuity for a future PUSCH transmission.

In some aspects, the coherence indication applies to a single PUSCH transmission that immediately follows the primary PUSCH transmission in the time domain. For example, the coherence indication may apply to a next PUSCH transmission that occurs after (for example, immediately after) the primary PUSCH transmission (for example, in a next PUSCH occasion that follows the primary PUSCH transmission without any intervening PUSCH transmissions by the UE 120). In this example, when the coherence indication is a single bit, a first value of the single bit may indicate that the primary PUSCH transmission is coherent with the next PUSCH transmission, and a second value of the bit may indicate that the primary PUSCH transmission is not coherent with the next PUSCH transmission. When the coherence indication applies to PUSCH transmission(s) that occur after the primary PUSCH transmission, this reduces decoding complexity for the base station 110 (as compared to when the coherence indication applies to PUSCH transmission(s) that occur before the primary PUSCH transmission) because the base station 110 will not need to perform channel estimation twice. For example, if the coherence indication applies to PUSCH transmission(s) that occur before the primary PUSCH transmission, then the base station 110 may need to perform first channel estimation to decode the UCI, determine whether to perform joint estimation for the PUSCH in connection with a prior PUSCH transmission based at least in part on the coherence indication in the UCI, and then perform second channel estimation to decode the PUSCH transmission (for example, jointly or separately, depending on the coherence indication). However, performing two channel estimations is less complex than if the coherence indication were not present, which would require performing channel estimation twice (a separate channel estimation and a joint channel estimation) for a PUSCH transmission, as well as performing decoding twice (using the separate channel estimation and the joint channel estimation) for the PUSCH transmission (and any accompanying UCI, if present).

In some aspects, the coherence indication applies to a set of (one or more) PUSCH transmissions that occur in a time window. An indication that defines the time window may be stored in memory of the UE 120 (for example, based at least in part on a wireless communication standard) or may be signaled to the UE 120 by the base station 110 (for example, in the configuration, in DCI, or in a MAC-CE). In some aspects, the time window may be indicated by an offset, a periodicity, or both an offset and a periodicity. In some aspects, the time window is defined with respect to the primary PUSCH transmission or the UCI multiplexed with the primary PUSCH transmission. For example, the primary PUSCH transmission or the UCI may define a beginning of the time window (for example, the start of the time window may be an initial symbol or a final symbol of the primary PUSCH transmission or the UCI), and the time window may have a length defined by a quantity of time domain resources that follow the primary PUSCH transmission or the UCI, such as a quantity of symbols, a quantity of mini-slots, or a quantity of slots, among other examples. As another example, the primary PUSCH transmission or the UCI may define an end of the time window (for example, the end of the time window may be an initial symbol or a final symbol of the primary PUSCH transmission or the UCI), and the time window may have a length defined by a quantity of time domain resources that precede the primary PUSCH transmission or the UCI. As another example, the primary PUSCH transmission or the UCI may occur within the time window (for example, neither at the beginning nor the end of the time window), and the time window may have a length defined by a first quantity of time domain resources that precede the primary PUSCH transmission or the UCI and a second quantity of time domain resources that follow the primary PUSCH transmission or the UCI. The first quantity and the second quantity may be the same or may be different. In this example, when the coherence indication is a single bit, a first value of the single bit may indicate that the primary PUSCH transmission is coherent with all of the (secondary) PUSCH transmissions that occur in the time window, and a second value of the bit may indicate that the primary PUSCH transmission is not coherent with all of the (secondary) PUSCH transmissions that occur in the time window.

In some aspects, the coherence indication includes multiple bits. In this example, each bit (of the multiple bits) may correspond to a different secondary PUSCH transmission, and a value of a bit may indicate whether the primary PUSCH transmission has phase continuity with the secondary PUSCH transmission that corresponds to that bit. For example, a coherence indication bit string of "101" may indicate that the primary PUSCH transmission has phase coherence with a first PUSCH transmission (corresponding to the first "1"), does not have phase coherence with a second PUSCH transmission (corresponding to the "0"), and has phase coherence with a third PUSCH transmission (corresponding to the second "1"). In some aspects, an order of the bits in the bit string may correspond to an order that the secondary PUSCH transmissions occur in the time domain. In some aspects, an initial bit in the bit string may correspond to a PUSCH transmission that occurs immediately after the primary PUSCH transmission (and, for example, all of the bits correspond to PUSCH transmissions that occur after the primary PUSCH transmission). Alternatively, a final bit in the bit string may correspond to a PUSCH transmission that occurs immediately before the primary PUSCH transmission (and, for example, all of the bits correspond to PUSCH transmissions that occur before the primary PUSCH transmission). Alternatively, one or more bits in the bit string may correspond to one or more PUSCH transmissions that occur before the primary PUSCH transmission, and one or more other bits in the bit string may correspond to one or more PUSCH transmissions that occur after the primary PUSCH transmission.

In some aspects, the coherence indication may apply to an absolute previous PUSCH transmission (with no intervening PUSCH transmissions from the primary PUSCH transmission), an absolute subsequent PUSCH transmission (with no intervening PUSCH transmissions from the primary PUSCH transmission), or all PUSCH transmissions in a time window, regardless of transmission parameters associated with those PUSCH transmissions. Alternatively, the coherence indication may apply to a previous PUSCH transmission that satisfies a set of conditions (for example, a PUSCH transmission that occurs closest in time prior to the primary PUSCH transmission and that satisfies the set of conditions), a subsequent PUSCH transmission that satisfies the set of conditions (for example, a PUSCH transmission that occurs closest in time after the primary PUSCH transmission and that satisfies the set of conditions), or only the PUSCH transmissions in a time window that satisfy the set of conditions. The set of (one or more) conditions may relate to whether a transmission parameter of a secondary PUSCH transmission is the same as a corresponding transmission parameter of the primary PUSCH transmission. The transmission parameter may include, for example, a resource block (RB) allocation, an uplink beam, a transmit power, or a precoder (for example, a precoding matrix). For example, the coherence indication may apply to secondary PUSCH transmissions that have a same RB allocation as the primary PUSCH transmission, that are transmitted on the same uplink beam as the primary PUSCH transmission, that are transmitted with the same transmit power as the primary PUSCH transmission, that have a same precoding (for example, that are transmitted using the same precoder) as the primary PUSCH transmission, or a combination thereof.

In some aspects, an absolute value of a bit in the coherence indication may indicate whether a corresponding secondary PUSCH transmission is coherent with the primary PUSCH transmission (for example, independent of bit values in any other coherence indications). In this example, a first value of the bit (for example, 1) may indicate that the primary PUSCH transmission and the secondary PUSCH transmission have phase continuity, and a second value of the bit (for example, 0) may indicate that the primary PUSCH transmission and the secondary PUSCH transmission do not have phase continuity, independent of bit values in any other coherence indications.

Alternatively, a relative value of a bit in the coherence indication, relative to a bit value in another coherence indication, may indicate whether a corresponding secondary PUSCH transmission is coherent with the primary PUSCH transmission. In this example, the bit value is used as a toggle to indicate phase coherence. For example, if a value of a bit in a coherence indication of a primary PUSCH transmission is the same as a value of a bit in a prior (or later) coherence indication associated with a secondary PUSCH transmission, then this may indicate that the primary PUSCH transmission is coherent with the secondary PUSCH transmission. Conversely, if a value of a bit in a coherence indication of a primary PUSCH transmission is different from a value of a bit in a prior (or later) coherence indication associated with a secondary PUSCH transmission, then this may indicate that the primary PUSCH transmission is not coherent with the secondary PUSCH transmission.

In some aspects, if hybrid automatic repeat request acknowledgement (HARQ-ACK) information, channel state information (CSI), or a scheduling request (SR) is present in UCI multiplexed with the primary PUSCH transmission, then the UE 120 may append the coherence indication for the primary PUSCH transmission to the HARQ-ACK information, the CSI, or the SR to conserve signaling overhead. If the HARQ-ACK information, the CSI, and the SR are not present in UCI multiplexed with the primary PUSCH transmission, then the UE 120 may transmit the coherence indication for the primary PUSCH transmission independently in UCI multiplexed with the primary PUSCH transmission (for example, the UCI may consist of only the coherence indication and not any other information).

As further shown in FIG. 5, the base station 110 may perform joint channel estimation or separate channel estimation based at least in part on the coherence indication. For example, if a coherence indication indicates that the primary PUSCH transmission is coherent with a secondary PUSCH transmission, then the base station 110 may perform joint channel estimation for the primary PUSCH transmission and the secondary PUSCH transmission (or a group of secondary PUSCH transmissions, depending on one or more coherence indications). Conversely, if a coherence indication indicates that the primary PUSCH transmission is not coherent with a secondary PUSCH transmission, then the base station 110 may separate joint channel estimation for the primary PUSCH transmission, independent of channel estimation performed for the secondary PUSCH transmission. Thus, the base station 110 may determine whether to perform separate joint channel estimation or joint channel estimation for the primary PUSCH transmission based at least in part on the coherence indication. Furthermore, if the base station 110 determines to perform joint channel estimation for the primary PUSCH transmission, then the base station 110 may determine which secondary PUSCH transmissions are coherent with the primary PUSCH transmission, for performing the joint channel estimation, based at least in part on the coherence indication associated with the primary PUSCH transmission (and one or more other coherence indications, in some aspects).

By enabling the UE 120 to indicate or control PUSCH DMRS bundling using a coherence indication, aspects and apparatuses described herein can be used to provide an unambiguous indication of whether different PUSCH transmissions are phase coherent with one another. As a result, the base station 110 can correctly determine when to perform joint channel estimation for a PUSCH transmission using multiple DMRSs, thereby improving the accuracy of channel estimation, reducing communication errors, and improving demodulation of the PUSCH transmission.

Figure 6:
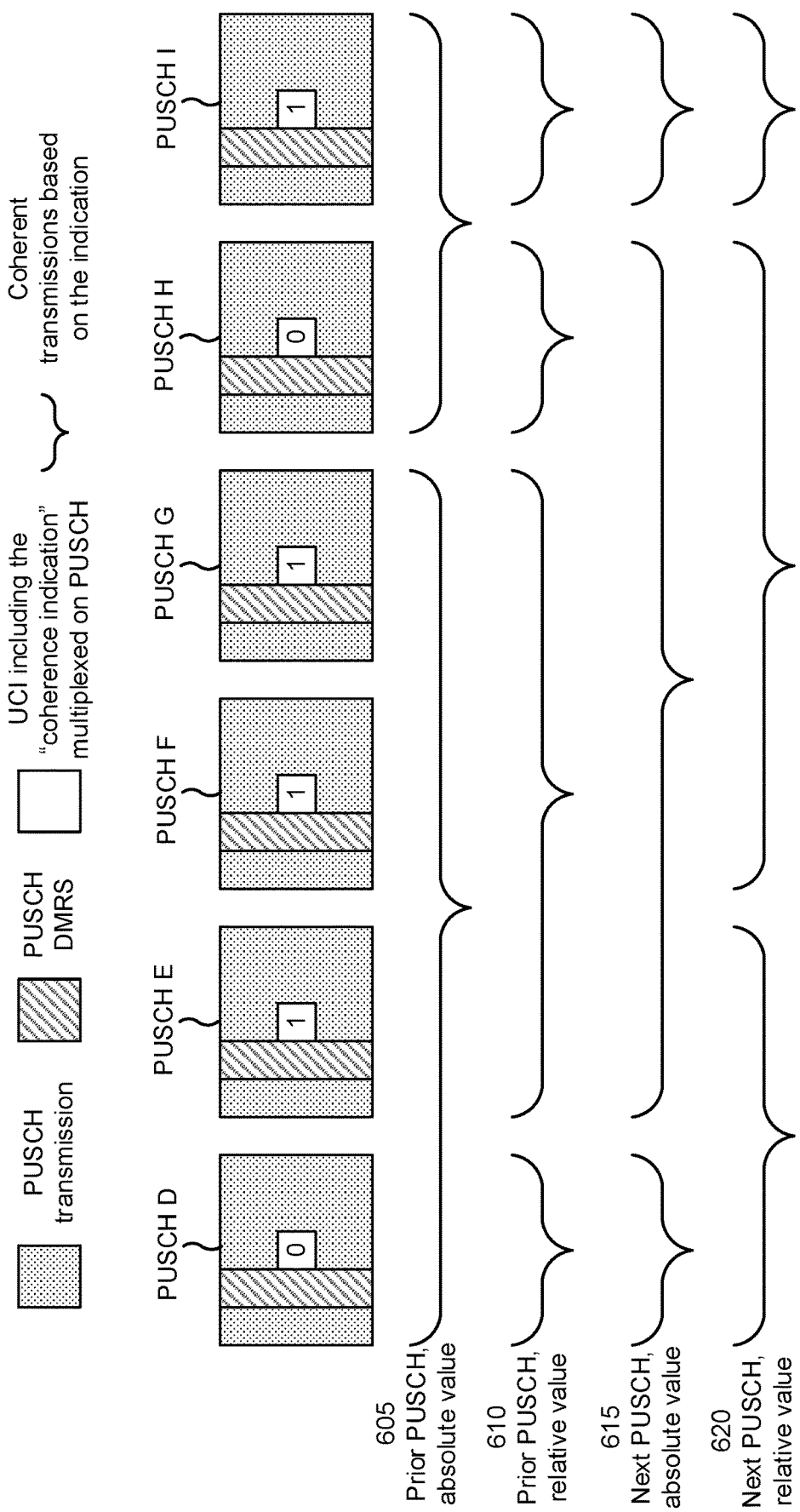

FIG. 6 is a diagram illustrating multiple examples associated with coherence indication for DMRS bundling in accordance with the present disclosure. FIG. 6 shows different examples where the coherence indication refers to either the previous PUSCH transmission or the next PUSCH transmission, and where the coherence indication indicates coherence using either an absolute value or a relative value.

In a first example 605, the coherence indication indicates whether the primary PUSCH transmission is coherent with an immediately prior PUSCH transmission using an absolute value of a single bit included in the PUSCH transmission. In this example, PUSCH E is coherent with PUSCH D because PUSCH E is multiplexed with UCI that includes a coherence indication having a value of 1 (indicative of phase coherence), PUSCH F is coherent with PUSCH E because PUSCH F is multiplexed with UCI that includes a coherence indication having a value of 1, and PUSCH G is coherent with PUSCH F because PUSCH G is multiplexed with UCI that includes a coherence indication having a value of 1. Thus, PUSCH D, PUSCH E, PUSCH F, and PUSCH G all have phase coherence with one another, and the base station 110 would perform joint channel estimation using the PUSCH DMRSs included in these PUSCHs. Continuing with this example, PUSCH H is not coherent with PUSCH G because PUSCH H is multiplexed with UCI that includes a coherence indication having a value of 0 (indicative of a lack of coherence). PUSCH I is coherent with PUSCH H because PUSCH I is multiplexed with UCI that includes a coherence indication having a value of 1. Thus, PUSCH H and PUSCH I have phase coherence with one another, and the base station 110 would perform joint channel estimation using the PUSCH DMRSs included in these PUSCHs.

In a second example 610, the coherence indication indicates whether the primary PUSCH transmission is coherent with an immediately prior PUSCH transmission using a relative value of a single bit included in the PUSCH transmission. In this example, PUSCH E is not coherent with PUSCH D because PUSCH E is multiplexed with UCI that includes a coherence indication having a value of 1, and PUSCH D is multiplexed with UCI that includes a coherence indication having a value of 0. Because the coherence indication value changes from PUSCH D to PUSCH E, these two PUSCH transmissions are not coherent. Continuing with this example, PUSCH E, PUSCH F, and PUSCH G are all coherent with one another because all three of these PUSCH transmissions are multiplexed with UCI that includes a coherence indication having a value of 1, and the value of the coherence indication does not change between consecutive PUSCH transmissions. Continuing with this example, PUSCH H is not coherent with PUSCH G because the value of the coherence indication changes from 1 in connection with PUSCH G to 0 in connection with PUSCH H. Similarly, PUSCH I is not coherent with PUSCH H because the value of the coherence indication changes from 0 in connection with PUSCH H to 1 in connection with PUSCH I.

In a third example 615, the coherence indication indicates whether the primary PUSCH transmission is coherent with an immediately subsequent (or next) PUSCH transmission using an absolute value of a single bit included in the PUSCH transmission. In this example, PUSCH E is not coherent with PUSCH D because PUSCH D is multiplexed with UCI that includes a coherence indication having a value of 0 (indicative of a lack of phase coherence). Continuing with this example, PUSCH F is coherent with PUSCH E because PUSCH E is multiplexed with UCI that includes a coherence indication having a value of 1 (indicative of phase coherence), PUSCH G is coherent with PUSCH F because PUSCH F is multiplexed with UCI that includes a coherence indication having a value of 1, and PUSCH H is coherent with PUSCH G because PUSCH G is multiplexed with UCI that includes a coherence indication having a value of 1. Thus, PUSCH E, PUSCH F, PUSCH G, and PUSCH H all have phase coherence with one another, and the base station 110 would perform joint channel estimation using the PUSCH DMRSs included in these PUSCHs. Continuing with this example, PUSCH I is not coherent with PUSCH H because PUSCH H is multiplexed with UCI that includes a coherence indication having a value of 0.

In a fourth example 620, the coherence indication indicates whether the primary PUSCH transmission is coherent with an immediately subsequent (or next) PUSCH transmission using a relative value of a single bit included in the PUSCH transmission. In this example, assume that a PUSCH transmission transmitted immediately prior to PUSCH D is multiplexed with UCI that includes a coherence indication having a value of 0. Because PUSCH D is also multiplexed with UCI that includes a coherence indication having a value of 0, this indicates that the next PUSCH after PUSCH D (in this example, PUSCH E) is coherent with PUSCH D. The change in coherence value from PUSCH D to PUSCH E (from 0 to 1) indicates that the next PUSCH after PUSCH E (in this example, PUSCH F) is not coherent with PUSCH E. Continuing with this example, PUSCH F, PUSCH G, and PUSCH H are coherent with one another because the coherence indication value does not change until PUSCH H, which indicates that the next PUSCH after PUSCH H (in this example, PUSCH I) is not coherent with PUSCH H.

Figure 7:
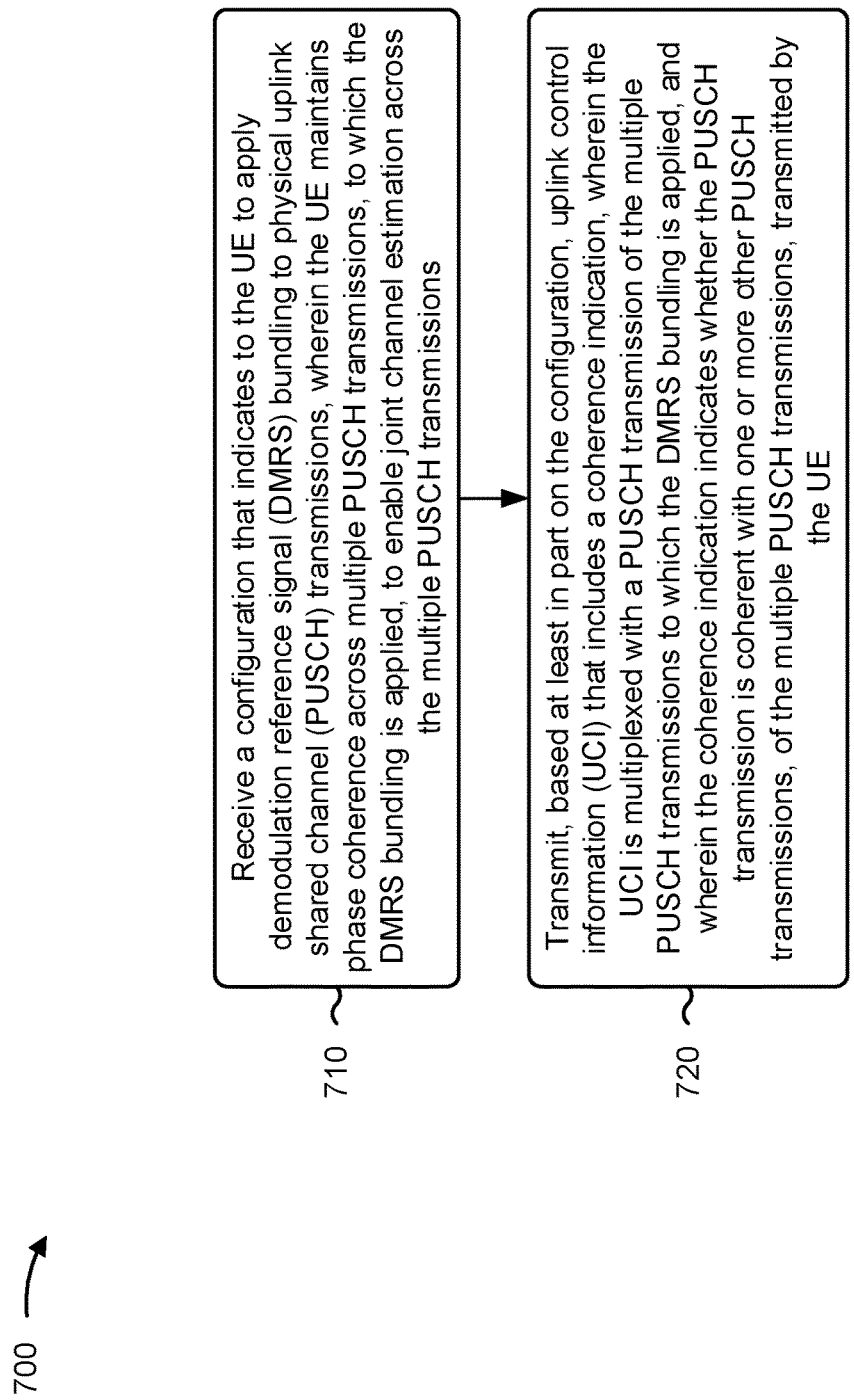
FIG. 7 is a flowchart illustrating an example process performed, for example, by a UE that supports coherence indication for DMRS bundling in accordance with the present disclosure.

FIG. 7 is a flowchart illustrating an example process 700 performed, for example, by a UE that supports coherence indication for DMRS bundling in accordance with the present disclosure. Example process 700 is an example where the UE (for example, UE 120) performs operations associated with coherence indication for demodulation reference signal bundling.

As shown in FIG. 7, in some aspects, process 700 may include receiving a configuration that indicates to (for example, instructs) the UE to apply DMRS bundling to PUSCH transmissions, wherein the UE maintains phase coherence across multiple PUSCH transmissions, to which the DMRS bundling is applied, to enable joint channel estimation across the multiple PUSCH transmissions (block 710). For example, the UE (such as by using reception component 902, depicted in FIG. 9) may receive a configuration that indicates to the UE to apply DMRS bundling to PUSCH transmissions, as described above. In some aspects, the UE may maintain phase coherence across multiple PUSCH transmissions, to which the DMRS bundling is applied, to enable joint channel estimation across the multiple PUSCH transmissions, as described above.

As further shown in FIG. 7, in some aspects, process 700 may include transmitting, based at least in part on the configuration, UCI that includes a coherence indication, wherein the UCI is multiplexed with a PUSCH transmission of the multiple PUSCH transmissions to which the DMRS bundling is applied, and wherein the coherence indication indicates whether the PUSCH transmission is coherent with one or more other PUSCH transmissions, of the multiple PUSCH transmissions, transmitted by the UE (block 720). For example, the UE (such as by using transmission component 906, depicted in FIG. 9) may transmit, based at least in part on the configuration, UCI that includes a coherence indication, as described above. In some aspects, the UCI is multiplexed with a PUSCH transmission of the multiple PUSCH transmissions to which the DMRS bundling is applied, as described above. In some aspects, the coherence indication indicates whether the PUSCH transmission is coherent with one or more other PUSCH transmissions, of the multiple PUSCH transmissions, transmitted by the UE, as described above.

Process 700 may include additional aspects, such as any single aspect or any combination of aspects described below or in connection with one or more other processes described elsewhere herein.

In a first additional aspect, the one or more other PUSCH transmissions include a single PUSCH transmission that immediately precedes the PUSCH transmission, and the coherence indication indicates whether the PUSCH transmission is coherent with the single PUSCH transmission that immediately precedes the PUSCH transmission.

In a second additional aspect, alone or in combination with the first aspect, the one or more other PUSCH transmissions include a single PUSCH transmission that immediately follows the PUSCH transmission, and the coherence indication indicates whether the PUSCH transmission is coherent with the single PUSCH transmission that immediately follows the PUSCH transmission.

In a third additional aspect, alone or in combination with one or more of the first and second aspects, the one or more other PUSCH transmissions occur in a time window, and the coherence indication indicates whether the PUSCH transmission is coherent with all of the one or more other PUSCH transmissions that occur in the time window.

In a fourth additional aspect, alone or in combination with one or more of the first through third aspects, process 700 includes receiving (such as by using reception component 902, depicted in FIG. 9) an indication that defines the time window.

In a fifth additional aspect, alone or in combination with one or more of the first through fourth aspects, the time window is defined with respect to the PUSCH transmission.

In a sixth additional aspect, alone or in combination with one or more of the first through fifth aspects, the one or more other PUSCH transmissions satisfy a set of conditions with respect to the PUSCH transmission, and the coherence indication indicates whether the PUSCH transmission is coherent with all of the one or more other PUSCH transmissions that satisfy the set of conditions.

In a seventh additional aspect, alone or in combination with one or more of the first through sixth aspects, the set of conditions includes at least one of the one or more other PUSCH transmissions having a same resource block allocation as the PUSCH transmission, the one or more other PUSCH transmissions being transmitted on a same uplink beam as the PUSCH transmission, the one or more other PUSCH transmissions being transmitted with a same transmit power as the PUSCH transmission, the one or more other PUSCH transmissions having a same precoding as the PUSCH transmission, or a combination thereof.

In an eighth additional aspect, alone or in combination with one or more of the first through seventh aspects, the coherence indication consists of a single bit.

In a ninth additional aspect, alone or in combination with one or more of the first through eighth aspects, an absolute value of the coherence indication indicates whether the PUSCH transmission is coherent with the one or more other PUSCH transmissions transmitted by the UE.

In a tenth additional aspect, alone or in combination with one or more of the first through ninth aspects, a relative value of the coherence indication, compared to a value of another transmitted coherence indication, indicates whether the PUSCH transmission is coherent with the one or more other PUSCH transmissions transmitted by the UE.

In an eleventh additional aspect, alone or in combination with one or more of the first through tenth aspects, the coherence indication is appended to at least one of HARQ-ACK information, CSI, or an SR if the at least one of the HARQ-ACK information, the CSI, or the SR is present in the UCI, or wherein the coherence indication is transmitted independent of the HARQ-ACK information, the CSI, or the SR if the HARQ-ACK information, the CSI, and the SR are not present in the UCI.

In a twelfth additional aspect, alone or in combination with one or more of the first through eleventh aspects, the PUSCH transmission is rate-matched around the UCI.

In a thirteenth additional aspect, alone or in combination with one or more of the first through twelfth aspects, the PUSCH transmission is punctured with the UCI.

In a fourteenth additional aspect, alone or in combination with one or more of the first through thirteenth aspects, the PUSCH transmission and the one or more other PUSCH transmissions include at least one of different PUSCH transmissions carrying different transport blocks, different repetitions of a particular PUSCH transmission, or a combination thereof.

In a fifteenth additional aspect, alone or in combination with one or more of the first through fourteenth aspects, process 700 includes transmitting (such as by using transmission component 906, depicted in FIG. 9) an indication of a capability of the UE to support transmission of the coherence indication for the DMRS bundling, and transmitting the UCI that includes the coherence indication comprises transmitting the UCI that includes the coherence indication based at least in part on the indication of the capability of the UE to support transmission of the coherence indication for the DMRS bundling.

In a sixteenth additional aspect, alone or in combination with one or more of the first through fifteenth aspects, process 700 includes receiving (such as by using reception component 902, depicted in FIG. 9) an instruction to transmit the coherence indication for the DMRS bundling, and transmitting the UCI that includes the coherence indication comprises transmitting the UCI that includes the coherence indication based at least in part on the instruction to transmit the coherence indication for the DMRS bundling.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
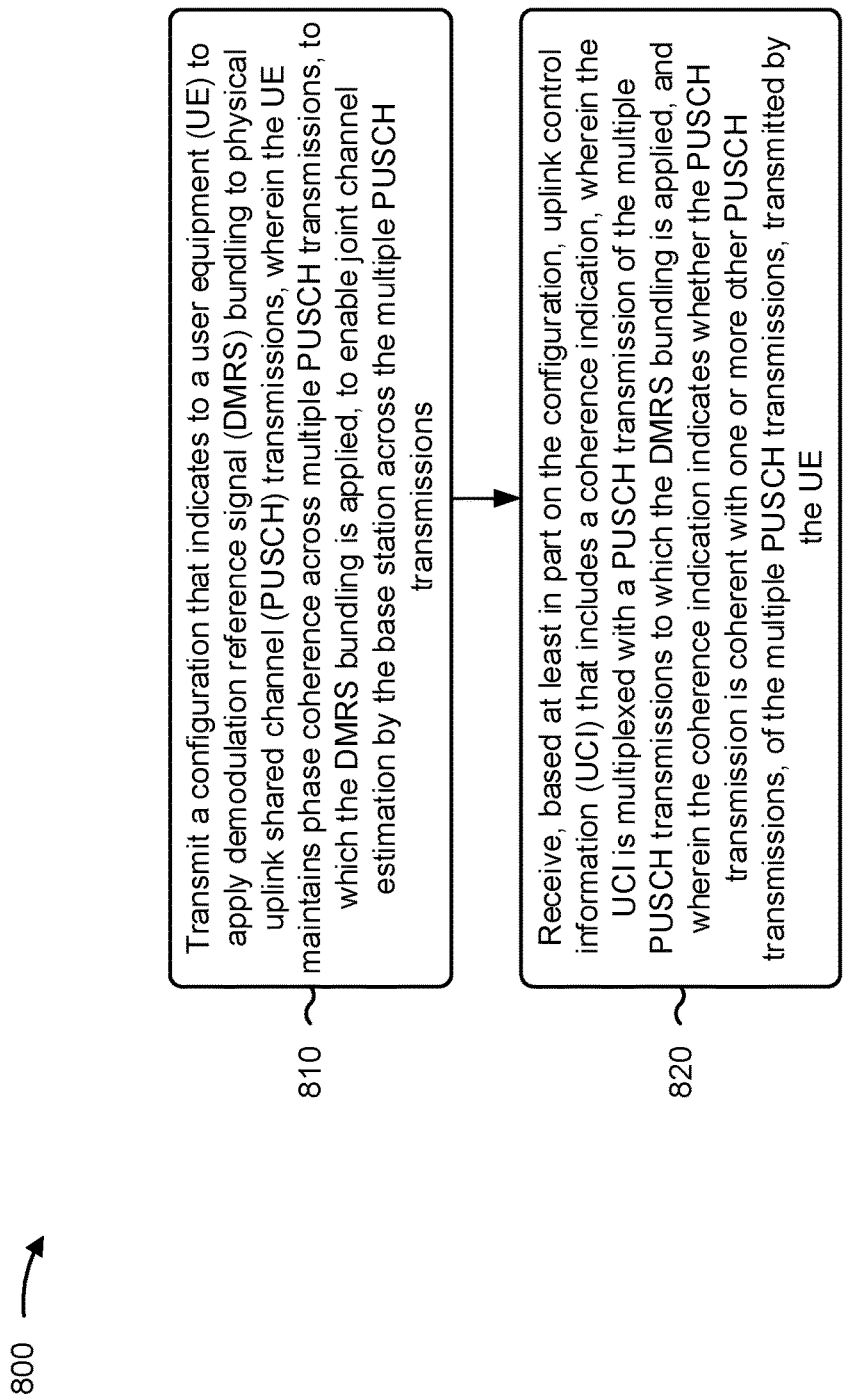
FIG. 8 is a flowchart illustrating an example process performed, for example, by a base station that supports coherence indication for DMRS bundling in accordance with the present disclosure.

FIG. 8 is a flowchart illustrating an example process 800 performed, for example, by a base station that supports coherence indication for DMRS bundling in accordance with the present disclosure. Example process 800 is an example where the base station (for example, base station 110) performs operations associated with coherence indication for demodulation reference signal bundling.

As shown in FIG. 8, in some aspects, process 800 may include transmitting a configuration that indicates to a UE to apply DMRS bundling to PUSCH transmissions, wherein the UE maintains phase coherence across multiple PUSCH transmissions, to which the DMRS bundling is applied, to enable joint channel estimation by the base station across the multiple PUSCH transmissions (block 810). For example, the base station (such as by using transmission component 1006, depicted in FIG. 10) may transmit a configuration that indicates to a UE to apply DMRS bundling to PUSCH transmissions, as described above. In some aspects, the UE maintains phase coherence across multiple PUSCH transmissions, to which the DMRS bundling is applied, to enable joint channel estimation by the base station across the multiple PUSCH transmissions, as described above.

As further shown in FIG. 8, in some aspects, process 800 may include receiving, based at least in part on the configuration, UCI that includes a coherence indication, wherein the UCI is multiplexed with a PUSCH transmission of the multiple PUSCH transmissions to which the DMRS bundling is applied, and wherein the coherence indication indicates whether the PUSCH transmission is coherent with one or more other PUSCH transmissions, of the multiple PUSCH transmissions, transmitted by the UE (block 820). For example, the base station (such as by using reception component 1002, depicted in FIG. 10) may receive, based at least in part on the configuration, UCI that includes a coherence indication, as described above. In some aspects, the UCI is multiplexed with a PUSCH transmission of the multiple PUSCH transmissions to which the DMRS bundling is applied, as described above. In some aspects, the coherence indication indicates whether the PUSCH transmission is coherent with one or more other PUSCH transmissions, of the multiple PUSCH transmissions, transmitted by the UE, as described above.

Process 800 may include additional aspects, such as any single aspect or any combination of aspects described below or in connection with one or more other processes described elsewhere herein.

Figure 10:
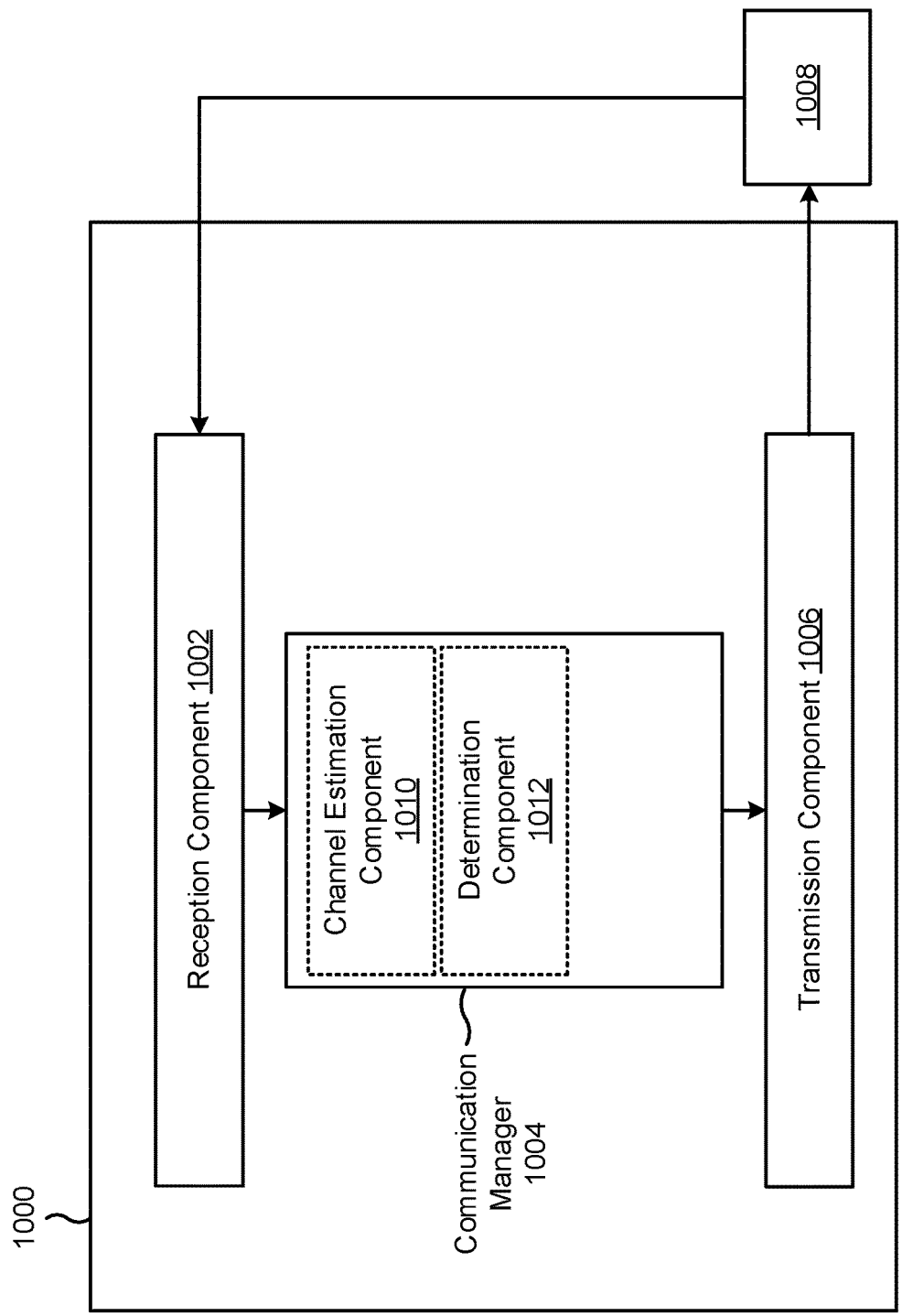

In a first additional aspect, process 800 includes performing joint channel estimation (such as by using channel estimation component 1010, depicted in FIG. 10) for the PUSCH transmission and the one or more other PUSCH transmissions based at least in part on the coherence indication.

In a second additional aspect, alone or in combination with the first aspect, process 800 includes performing separate channel estimation (such as by using channel estimation component 1010, depicted in FIG. 10) for the PUSCH transmission based at least in part on the coherence indication.

In a third additional aspect, alone or in combination with one or more of the first and second aspects, process 800 includes determining (such as by using determination component 1012, depicted in FIG. 10) whether to perform joint channel estimation or separate channel estimation for the PUSCH transmission based at least in part on the coherence indication.

In a fourth additional aspect, alone or in combination with one or more of the first through third aspects, the one or more other PUSCH transmissions include a single PUSCH transmission that immediately precedes the PUSCH transmission, and the coherence indication indicates whether the PUSCH transmission is coherent with the single PUSCH transmission that immediately precedes the PUSCH transmission.

In a fifth additional aspect, alone or in combination with one or more of the first through fourth aspects, the one or more other PUSCH transmissions include a single PUSCH transmission that immediately follows the PUSCH transmission, and the coherence indication indicates whether the PUSCH transmission is coherent with the single PUSCH transmission that immediately follows the PUSCH transmission.

In a sixth additional aspect, alone or in combination with one or more of the first through fifth aspects, the one or more other PUSCH transmissions occur in a time window, and the coherence indication indicates whether the PUSCH transmission is coherent with all of the one or more other PUSCH transmissions that occur in the time window.

In a seventh additional aspect, alone or in combination with one or more of the first through sixth aspects, process 800 includes transmitting (such as by using transmission component 1006, depicted in FIG. 10) an indication that defines the time window.

In an eighth additional aspect, alone or in combination with one or more of the first through seventh aspects, the time window is defined with respect to the PUSCH transmission.

In a ninth additional aspect, alone or in combination with one or more of the first through eighth aspects, the one or more other PUSCH transmissions satisfy a set of conditions with respect to the PUSCH transmission, and the coherence indication indicates whether the PUSCH transmission is coherent with all of the one or more other PUSCH transmissions that satisfy the set of conditions.

In a tenth additional aspect, alone or in combination with one or more of the first through ninth aspects, the set of conditions includes at least one of the one or more other PUSCH transmissions having a same resource block allocation as the PUSCH transmission, the one or more other PUSCH transmissions being transmitted on a same uplink beam as the PUSCH transmission, the one or more other PUSCH transmissions being transmitted with a same transmit power as the PUSCH transmission, the one or more other PUSCH transmissions having a same precoding as the PUSCH transmission, or a combination thereof.

In an eleventh additional aspect, alone or in combination with one or more of the first through tenth aspects, the coherence indication consists of a single bit.

In a twelfth additional aspect, alone or in combination with one or more of the first through eleventh aspects, an absolute value of the coherence indication indicates whether the PUSCH transmission is coherent with the one or more other PUSCH transmissions transmitted by the UE.

In a thirteenth additional aspect, alone or in combination with one or more of the first through twelfth aspects, a relative value of the coherence indication, compared to a value of another transmitted coherence indication, indicates whether the PUSCH transmission is coherent with the one or more other PUSCH transmissions transmitted by the UE.

In a fourteenth additional aspect, alone or in combination with one or more of the first through thirteenth aspects, the coherence indication is appended to at least one of HARQ-ACK information, CSI, or an SR if the at least one of the HARQ-ACK information, the CSI, or the SR is present in the UCI, or wherein the coherence indication is received independent of the HARQ-ACK information, the CSI, or the SR if the HARQ-ACK information, the CSI, and the SR are not present in the UCI.

In a fifteenth additional aspect, alone or in combination with one or more of the first through fourteenth aspects, the PUSCH transmission is rate-matched around the UCI.

In a sixteenth additional aspect, alone or in combination with one or more of the first through fifteenth aspects, the PUSCH transmission is punctured with the UCI.

In a seventeenth additional aspect, alone or in combination with one or more of the first through sixteenth aspects, the PUSCH transmission and the one or more other PUSCH transmissions include at least one of different PUSCH transmissions carrying different transport blocks, different repetitions of a particular PUSCH transmission, or a combination thereof.

In an eighteenth additional aspect, alone or in combination with one or more of the first through seventeenth aspects, process 800 includes receiving (such as by using reception component 1002, depicted in FIG. 10) an indication of a capability of the UE to support transmission of the coherence indication for the DMRS bundling, and receiving the UCI that includes the coherence indication comprises receiving the UCI that includes the coherence indication based at least in part on the indication of the capability of the UE to support transmission of the coherence indication for the DMRS bundling.

In a nineteenth additional aspect, alone or in combination with one or more of the first through eighteenth aspects, process 800 includes transmitting (such as by using transmission component 1006, depicted in FIG. 10) an instruction to transmit the coherence indication for the DMRS bundling, and receiving the UCI that includes the coherence indication comprises receiving the UCI that includes the coherence indication based at least in part on the instruction to transmit the coherence indication for the DMRS bundling.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
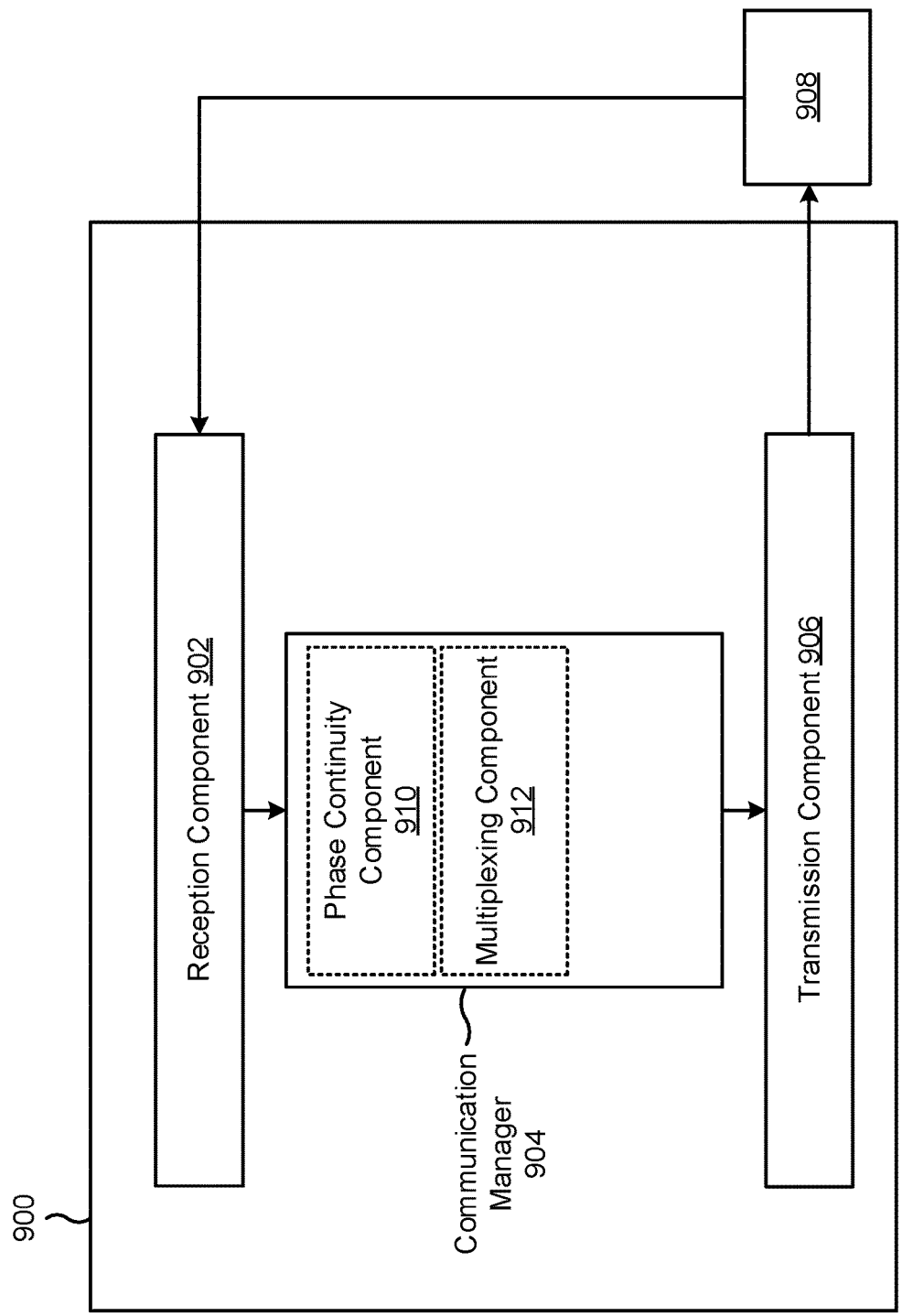
FIGS. 9 and 10 are block diagrams of example apparatuses for wireless communication that support coherence indication for DMRS bundling in accordance with the present disclosure.

FIG. 9 is a block diagram of an example apparatus 900 for wireless communication that supports coherence indication for DMRS bundling in accordance with the present disclosure. The apparatus 900 may be a UE, or a UE may include the apparatus 900. In some aspects, the apparatus 900 includes a reception component 902, a communication manager 904, and a transmission component 906, which may be in communication with one another (for example, via one or more buses). As shown, the apparatus 900 may communicate with another apparatus 908 (such as a UE, a base station, or another wireless communication device) using the reception component 902 and the transmission component 906.

In some aspects, the apparatus 900 may be configured to perform one or more operations described herein in connection with FIGS. 5-6. Additionally or alternatively, the apparatus 900 may be configured to perform one or more processes described herein, such as process 700 of FIG. 7. In some aspects, the apparatus 900 may include one or more components of the UE described above in connection with FIG. 2.

The reception component 902 may receive communications, such as reference signals, control information, data communications, or a combination thereof, from the apparatus 908. The reception component 902 may provide received communications to one or more other components of the apparatus 900, such as the communication manager 904. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the UE described above in connection with FIG. 2.

The transmission component 906 may transmit communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 906 may include one or more antennas, a modulator, a transmit MIMO processor, a transmit processor, a controller/processor, a memory, or a combination thereof, of the UE described above in connection with FIG. 2. In some aspects, the transmission component 906 may be co-located with the reception component 902 in a transceiver.

The communication manager 904 may receive or may cause the reception component 902 to receive a configuration that indicates to the UE to apply DMRS bundling to PUSCH transmissions, wherein the UE maintains phase coherence across multiple PUSCH transmissions, to which the DMRS bundling is applied, to enable joint channel estimation across the multiple PUSCH transmissions. The communication manager 904 may transmit or may cause the transmission component 906 to transmit, based at least in part on the configuration, UCI that includes a coherence indication, wherein the UCI is multiplexed with a PUSCH transmission of the multiple PUSCH transmissions to which the DMRS bundling is applied, and wherein the coherence indication indicates whether the PUSCH transmission is coherent with one or more other PUSCH transmissions, of the multiple PUSCH transmissions, transmitted by the UE. In some aspects, the communication manager 904 may perform one or more operations described elsewhere herein as being performed by one or more components of the communication manager 904.

The communication manager 904 may include a controller/processor, a memory, or a combination thereof, of the UE described above in connection with FIG. 2. In some aspects, the communication manager 904 includes a set of components, such as a phase continuity component 910, a multiplexing component 912, or a combination thereof. Alternatively, the set of components may be separate and distinct from the communication manager 904. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive a configuration that indicates to the UE to apply DMRS bundling to PUSCH transmissions, wherein the UE maintains phase coherence across multiple PUSCH transmissions, to which the DMRS bundling is applied, to enable joint channel estimation across the multiple PUSCH transmissions. The phase continuity component 910 may be used by the UE to maintain phase continuity across the multiple PUSCH transmissions. The transmission component 906 may transmit, based at least in part on the configuration, UCI that includes a coherence indication, wherein the UCI is multiplexed with a PUSCH transmission of the multiple PUSCH transmissions to which the DMRS bundling is applied, and wherein the coherence indication indicates whether the PUSCH transmission is coherent with one or more other PUSCH transmissions, of the multiple PUSCH transmissions, transmitted by the UE. The multiplexing component 912 may be used by the UE to multiplex the UCI and the PUSCH transmission.

The reception component 902 may receive an indication that defines the time window. The transmission component 906 may transmit an indication of a capability of the UE to support transmission of the coherence indication for the DMRS bundling, and may transmit the UCI that includes the coherence indication based at least in part on the indication of the capability of the UE to support transmission of the coherence indication for the DMRS bundling. The reception component 902 may receive an instruction to transmit the coherence indication for the DMRS bundling. The transmission component 906 may transmit the UCI that includes the coherence indication based at least in part on the instruction to transmit the coherence indication for the DMRS bundling.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

FIG. 10 is a block diagram of an example apparatus 1000 for wireless communication that supports coherence indication for DMRS bundling in accordance with the present disclosure. The apparatus 1000 may be a base station, or a base station may include the apparatus 1000. In some aspects, the apparatus 1000 includes a reception component 1002, a communication manager 1004, and a transmission component 1006, which may be in communication with one another (for example, via one or more buses). As shown, the apparatus 1000 may communicate with another apparatus 1008 (such as a UE, a base station, or another wireless communication device) using the reception component 1002 and the transmission component 1006.

In some aspects, the apparatus 1000 may be configured to perform one or more operations described herein in connection with FIGS. 5-6. Additionally or alternatively, the apparatus 1000 may be configured to perform one or more processes described herein, such as process 800 of FIG. 8. In some aspects, the apparatus 1000 may include one or more components of the base station described above in connection with FIG. 2.

The reception component 1002 may receive communications, such as reference signals, control information, data communications, or a combination thereof, from the apparatus 1008. The reception component 1002 may provide received communications to one or more other components of the apparatus 1000, such as the communication manager 1004. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the base station described above in connection with FIG. 2.

The transmission component 1006 may transmit communications, such as reference signals, control information, data communications, or a combination thereof, to the apparatus 1008. In some aspects, the communication manager 1004 may generate communications and may transmit the generated communications to the transmission component 1006 for transmission to the apparatus 1008. In some aspects, the transmission component 1006 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1006 may include one or more antennas, a modulator, a transmit MIMO processor, a transmit processor, a controller/processor, a memory, or a combination thereof, of the base station described above in connection with FIG. 2. In some aspects, the transmission component 1006 may be co-located with the reception component 1002 in a transceiver.

The communication manager 1004 may transmit or may cause the transmission component 1006 to transmit a configuration that indicates to a UE to apply DMRS bundling to PUSCH transmissions, wherein the UE maintains phase coherence across multiple PUSCH transmissions, to which the DMRS bundling is applied, to enable joint channel estimation by the base station across the multiple PUSCH transmissions. The communication manager 1004 may receive or may cause the reception component 1002 to receive, based at least in part on the configuration, UCI that includes a coherence indication, wherein the UCI is multiplexed with a PUSCH transmission of the multiple PUSCH transmissions to which the DMRS bundling is applied, and wherein the coherence indication indicates whether the PUSCH transmission is coherent with one or more other PUSCH transmissions, of the multiple PUSCH transmissions, transmitted by the UE. In some aspects, the communication manager 1004 may perform one or more operations described elsewhere herein as being performed by one or more components of the communication manager 1004.

The communication manager 1004 may include a controller/processor, a memory, a scheduler, a communication unit, or a combination thereof, of the base station described above in connection with FIG. 2. In some aspects, the communication manager 1004 includes a set of components, such as a channel estimation component 1010, a determination component 1012, or a combination thereof. Alternatively, the set of components may be separate and distinct from the communication manager 1004. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1006 may transmit a configuration that indicates to a UE to apply DMRS bundling to PUSCH transmissions, wherein the UE maintains phase coherence across multiple PUSCH transmissions, to which the DMRS bundling is applied, to enable joint channel estimation by the base station across the multiple PUSCH transmissions. The reception component 1002 may receive, based at least in part on the configuration, UCI that includes a coherence indication, wherein the UCI is multiplexed with a PUSCH transmission of the multiple PUSCH transmissions to which the DMRS bundling is applied, and wherein the coherence indication indicates whether the PUSCH transmission is coherent with one or more other PUSCH transmissions, of the multiple PUSCH transmissions, transmitted by the UE.

The channel estimation component 1010 may perform joint channel estimation for the PUSCH transmission and the one or more other PUSCH transmissions based at least in part on the coherence indication. The channel estimation component 1010 may perform separate channel estimation for the PUSCH transmission based at least in part on the coherence indication. The determination component 1012 may determine whether to perform joint channel estimation or separate channel estimation for the PUSCH transmission based at least in part on the coherence indication. The transmission component 1006 may transmit an indication that defines the time window. The reception component 1002 may receive an indication of a capability of the UE to support transmission of the coherence indication for the DMRS bundling. The reception component 1002 may receive the UCI that includes the coherence indication based at least in part on the indication of the capability of the UE to support transmission of the coherence indication for the DMRS bundling. The transmission component 1006 may transmit an instruction to transmit the coherence indication for the DMRS bundling. The reception component 1002 may receive the UCI that includes the coherence indication based at least in part on the instruction to transmit the coherence indication for the DMRS bundling.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The following provides an overview of some aspects of the present disclosure:

Aspect 1: A method of wireless communication performed by a user equipment (UE), comprising: receiving a configuration that indicates to the UE to apply demodulation reference signal (DMRS) bundling to physical uplink shared channel (PUSCH) transmissions, wherein the UE maintains phase coherence across multiple PUSCH transmissions, to which the DMRS bundling is applied, to enable joint channel estimation across the multiple PUSCH transmissions; and transmitting, based at least in part on the configuration, uplink control information (UCI) that includes a coherence indication, wherein the UCI is multiplexed with a PUSCH transmission of the multiple PUSCH transmissions to which the DMRS bundling is applied, and wherein the coherence indication indicates whether the PUSCH transmission is coherent with one or more other PUSCH transmissions, of the multiple PUSCH transmissions, transmitted by the UE.

Aspect 2: The method of aspect 1, wherein the one or more other PUSCH transmissions include a single PUSCH transmission that immediately precedes the PUSCH transmission, and wherein the coherence indication indicates whether the PUSCH transmission is coherent with the single PUSCH transmission that immediately precedes the PUSCH transmission.

Aspect 3: The method of aspect 1, wherein the one or more other PUSCH transmissions include a single PUSCH transmission that immediately follows the PUSCH transmission, and wherein the coherence indication indicates whether the PUSCH transmission is coherent with the single PUSCH transmission that immediately follows the PUSCH transmission.

Aspect 4: The method of aspect 1, wherein the one or more other PUSCH transmissions occur in a time window, and wherein the coherence indication indicates whether the PUSCH transmission is coherent with all of the one or more other PUSCH transmissions that occur in the time window.

Aspect 5: The method of aspect 4, further comprising receiving an indication that defines the time window.

Aspect 6: The method of any of aspects 4-5, wherein the time window is defined with respect to the PUSCH transmission.

Aspect 7: The method of any of the preceding aspects, wherein the one or more other PUSCH transmissions satisfy a set of conditions with respect to the PUSCH transmission, and wherein the coherence indication indicates whether the PUSCH transmission is coherent with all of the one or more other PUSCH transmissions that satisfy the set of conditions.

Aspect 8: The method of aspect 7, wherein the set of conditions includes at least one of: the one or more other PUSCH transmissions having a same resource block allocation as the PUSCH transmission, the one or more other PUSCH transmissions being transmitted on a same uplink beam as the PUSCH transmission, the one or more other PUSCH transmissions being transmitted with a same transmit power as the PUSCH transmission, the one or more other PUSCH transmissions having a same precoding as the PUSCH transmission, or a combination thereof.

Aspect 9: The method of any of the preceding aspects, wherein the coherence indication consists of a single bit.

Aspect 10: The method of any of the preceding aspects, wherein an absolute value of the coherence indication indicates whether the PUSCH transmission is coherent with the one or more other PUSCH transmissions transmitted by the UE.

Aspect 11: The method of any of aspects 1-9, wherein a relative value of the coherence indication, compared to a value of another transmitted coherence indication, indicates whether the PUSCH transmission is coherent with the one or more other PUSCH transmissions transmitted by the UE.

Aspect 12: The method of any of the preceding aspects, wherein the coherence indication is appended to at least one of hybrid automatic repeat request acknowledgement (HARQ-ACK) information, channel state information (CSI), or a scheduling request (SR) if the at least one of the HARQ-ACK information, the CSI, or the SR is present in the UCI, or wherein the coherence indication is transmitted independent of the HARQ-ACK information, the CSI, or the SR if the HARQ-ACK information, the CSI, and the SR are not present in the UCI.

Aspect 13: The method of any of the preceding aspects, wherein the PUSCH transmission is rate-matched around the UCI.

Aspect 14: The method of any of aspects 1-12, wherein the PUSCH transmission is punctured with the UCI.

Aspect 15: The method of any of the preceding aspects, wherein the PUSCH transmission and the one or more other PUSCH transmissions include at least one of: different PUSCH transmissions carrying different transport blocks, different repetitions of a particular PUSCH transmission, or a combination thereof.

Aspect 16: The method of any of the preceding aspects, further comprising transmitting an indication of a capability of the UE to support transmission of the coherence indication for the DMRS bundling; and wherein transmitting the UCI that includes the coherence indication comprises transmitting the UCI that includes the coherence indication based at least in part on the indication of the capability of the UE to support transmission of the coherence indication for the DMRS bundling.

Aspect 17: The method of any of the preceding aspects, further comprising receiving an instruction to transmit the coherence indication for the DMRS bundling; and wherein transmitting the UCI that includes the coherence indication comprises transmitting the UCI that includes the coherence indication based at least in part on the instruction to transmit the coherence indication for the DMRS bundling.

Aspect 18: A method of wireless communication performed by a base station, comprising: transmitting a configuration that indicates to a user equipment (UE) to apply demodulation reference signal (DMRS) bundling to physical uplink shared channel (PUSCH) transmissions, wherein the UE maintains phase coherence across multiple PUSCH transmissions, to which the DMRS bundling is applied, to enable joint channel estimation by the base station across the multiple PUSCH transmissions; and receiving, based at least in part on the configuration, uplink control information (UCI) that includes a coherence indication, wherein the UCI is multiplexed with a PUSCH transmission of the multiple PUSCH transmissions to which the DMRS bundling is applied, and wherein the coherence indication indicates whether the PUSCH transmission is coherent with one or more other PUSCH transmissions, of the multiple PUSCH transmissions, transmitted by the UE.

Aspect 19: The method of aspect 18, further comprising performing joint channel estimation for the PUSCH transmission and the one or more other PUSCH transmissions based at least in part on the coherence indication.

Aspect 20: The method of aspect 18, further comprising performing separate channel estimation for the PUSCH transmission based at least in part on the coherence indication.

Aspect 21: The method of any of aspects 18-20, further comprising determining whether to perform joint channel estimation or separate channel estimation for the PUSCH transmission based at least in part on the coherence indication.

Aspect 22: The method of any of aspects 18-20, wherein the one or more other PUSCH transmissions include a single PUSCH transmission that immediately precedes the PUSCH transmission, and wherein the coherence indication indicates whether the PUSCH transmission is coherent with the single PUSCH transmission that immediately precedes the PUSCH transmission.

Aspect 23: The method of any of aspects 18-20, wherein the one or more other PUSCH transmissions include a single PUSCH transmission that immediately follows the PUSCH transmission, and wherein the coherence indication indicates whether the PUSCH transmission is coherent with the single PUSCH transmission that immediately follows the PUSCH transmission.

Aspect 24: The method of any of aspects 18-20, wherein the one or more other PUSCH transmissions occur in a time window, and wherein the coherence indication indicates whether the PUSCH transmission is coherent with all of the one or more other PUSCH transmissions that occur in the time window.

Aspect 25: The method of aspect 24, further comprising transmitting an indication that defines the time window.

Aspect 26: The method of any of aspects 24-25, wherein the time window is defined with respect to the PUSCH transmission.

Aspect 27: The method of any of aspects 18-26, wherein the one or more other PUSCH transmissions satisfy a set of conditions with respect to the PUSCH transmission, and wherein the coherence indication indicates whether the PUSCH transmission is coherent with all of the one or more other PUSCH transmissions that satisfy the set of conditions.

Aspect 28: The method of aspect 27, wherein the set of conditions includes at least one of: the one or more other PUSCH transmissions having a same resource block allocation as the PUSCH transmission, the one or more other PUSCH transmissions being transmitted on a same uplink beam as the PUSCH transmission, the one or more other PUSCH transmissions being transmitted with a same transmit power as the PUSCH transmission, the one or more other PUSCH transmissions having a same precoding as the PUSCH transmission, or a combination thereof.

Aspect 29: The method of any of aspects 18-28, wherein the coherence indication consists of a single bit.

Aspect 30: The method of any of aspects 18-29, wherein an absolute value of the coherence indication indicates whether the PUSCH transmission is coherent with the one or more other PUSCH transmissions transmitted by the UE.

Aspect 31: The method of any of aspects 18-29, wherein a relative value of the coherence indication, compared to a value of another transmitted coherence indication, indicates whether the PUSCH transmission is coherent with the one or more other PUSCH transmissions transmitted by the UE.

Aspect 32: The method of any of aspects 18-31, wherein the coherence indication is appended to at least one of hybrid automatic repeat request acknowledgement (HARQ-ACK) information, channel state information (CSI), or a scheduling request (SR) if the at least one of the HARQ-ACK information, the CSI, or the SR is present in the UCI, or wherein the coherence indication is received independent of the HARQ-ACK information, the CSI, or the SR if the HARQ-ACK information, the CSI, and the SR are not present in the UCI.

Aspect 33: The method of any of aspects 18-32, wherein the PUSCH transmission is rate-matched around the UCI.

Aspect 34: The method of any of aspects 18-32, wherein the PUSCH transmission is punctured with the UCI.

Aspect 35: The method of any of aspects 18-34, wherein the PUSCH transmission and the one or more other PUSCH transmissions include at least one of: different PUSCH transmissions carrying different transport blocks, different repetitions of a particular PUSCH transmission, or a combination thereof.

Aspect 36: The method of any of aspects 18-35, further comprising receiving an indication of a capability of the UE to support transmission of the coherence indication for the DMRS bundling; and wherein receiving the UCI that includes the coherence indication comprises receiving the UCI that includes the coherence indication based at least in part on the indication of the capability of the UE to support transmission of the coherence indication for the DMRS bundling.

Aspect 37: The method of any of aspects 18-36, further comprising transmitting an instruction to transmit the coherence indication for the DMRS bundling; and wherein receiving the UCI that includes the coherence indication comprises receiving the UCI that includes the coherence indication based at least in part on the instruction to transmit the coherence indication for the DMRS bundling.

Aspect 29: An apparatus for wireless communication at a device, comprising a processor; memory coupled with the processor; and instructions (e.g., processor-readable code) stored in the memory and executable by the processor to cause the apparatus to perform the method of one or more aspects of aspects 1-17.

Aspect 30: A device for wireless communication, comprising a memory (e.g., at least one memory) and one or more processors (e.g., at least one processor) coupled to the memory, the memory and the one or more processors configured to perform (e.g., via execution, by the one or more processors, of processor-readable code stored by the memory) the method of one or more aspects of aspects 1-17.

Aspect 31: An apparatus for wireless communication, comprising at least one means for performing the method of one or more aspects of aspects 1-17.

Aspect 32: A non-transitory computer-readable medium storing code for wireless communication, the code comprising instructions executable by a processor to perform the method of one or more aspects of aspects 1-17.

Aspect 33: A non-transitory computer-readable medium storing a set of instructions for wireless communication, the set of instructions comprising one or more instructions that, when executed by one or more processors of a device, cause the device to perform the method of one or more aspects of aspects 1-17.

Aspect 34: An apparatus for wireless communication at a device, comprising a processor; memory coupled with the processor; and instructions (e.g., processor-readable code)

stored in the memory and executable by the processor to cause the apparatus to perform the method of one or more aspects of aspects 18-37.

Aspect 35: A device for wireless communication, comprising a memory (e.g., at least one memory) and one or more processors (e.g., at least one processor) coupled to the memory, the memory and the one or more processors configured to perform (e.g., via execution, by the one or more processors, of processor-readable code stored by the memory) the method of one or more aspects of aspects 18-37.

Aspect 36: An apparatus for wireless communication, comprising at least one means for performing the method of one or more aspects of aspects 18-37.

Aspect 37: A non-transitory computer-readable medium storing code for wireless communication, the code comprising instructions executable by a processor to perform the method of one or more aspects of aspects 18-37.

Aspect 38: A non-transitory computer-readable medium storing a set of instructions for wireless communication, the set of instructions comprising one or more instructions that, when executed by one or more processors of a device, cause the device to perform the method of one or more aspects of aspects 18-37.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
    at least one processor; and
    at least one memory communicatively coupled with the at least one processor and storing processor-readable code that, when executed by the at least one processor, is configured to cause the UE to:
        receive a configuration that indicates to the UE to apply demodulation reference signal (DMRS) bundling to physical uplink shared channel (PUSCH) transmissions, wherein the UE maintains phase coherence across multiple PUSCH transmissions, to which the DMRS bundling is applied, to enable joint channel estimation across the multiple PUSCH transmissions; and
        transmit, based at least in part on the configuration, uplink control information (UCI) that includes a coherence indication, wherein the UCI is multiplexed with a PUSCH transmission of the multiple PUSCH transmissions to which the DMRS bundling is applied, and wherein the coherence indication indicates whether the PUSCH transmission is coherent with one or more other PUSCH transmissions, of the multiple PUSCH transmissions, transmitted by the UE.

2. The UE of claim 1, wherein the one or more other PUSCH transmissions include a single PUSCH transmission that immediately precedes the PUSCH transmission, and wherein the coherence indication indicates whether the PUSCH transmission is coherent with the single PUSCH transmission that immediately precedes the PUSCH transmission.

3. The UE of claim 1, wherein the one or more other PUSCH transmissions include a single PUSCH transmission that immediately follows the PUSCH transmission, and wherein the coherence indication indicates whether the PUSCH transmission is coherent with the single PUSCH transmission that immediately follows the PUSCH transmission.

4. The UE of claim 1, wherein the one or more other PUSCH transmissions occur in a time window, and wherein the coherence indication indicates whether the PUSCH transmission is coherent with all of the one or more other PUSCH transmissions that occur in the time window.

5. The UE of claim 4, wherein the processor-readable code is further configured to cause the UE to receive an indication that defines the time window.

6. The UE of claim 4, wherein the time window is defined with respect to the PUSCH transmission.

7. The UE of claim 1, wherein the one or more other PUSCH transmissions satisfy a set of conditions with respect to the PUSCH transmission, and wherein the coherence indication indicates whether the PUSCH transmission is coherent with all of the one or more other PUSCH transmissions that satisfy the set of conditions.

8. The UE of claim 7, wherein the set of conditions includes at least one of:
the one or more other PUSCH transmissions having a same resource block allocation as the PUSCH transmission,
the one or more other PUSCH transmissions being transmitted on a same uplink beam as the PUSCH transmission,
the one or more other PUSCH transmissions being transmitted with a same transmit power as the PUSCH transmission,
the one or more other PUSCH transmissions having a same precoding as the PUSCH transmission, or
a combination thereof.

9. The UE of claim 1, wherein the coherence indication consists of a single bit.

10. The UE of claim 1, wherein an absolute value of the coherence indication indicates whether the PUSCH transmission is coherent with the one or more other PUSCH transmissions transmitted by the UE.

11. The UE of claim 1, wherein a relative value of the coherence indication, compared to a value of another transmitted coherence indication, indicates whether the PUSCH transmission is coherent with the one or more other PUSCH transmissions transmitted by the UE.

12. The UE of claim 1, wherein the coherence indication is appended to at least one of hybrid automatic repeat request acknowledgement (HARQ-ACK) information, channel state information (CSI), or a scheduling request (SR) if the at least one of the HARQ-ACK information, the CSI, or the SR is present in the UCI, or
wherein the coherence indication is transmitted independent of the HARQ-ACK information, the CSI, or the SR if the HARQ-ACK information, the CSI, and the SR are not present in the UCI.

13. The UE of claim 1, wherein the PUSCH transmission is rate-matched around the UCI or is punctured with the UCI.

14. The UE of claim 1, wherein the PUSCH transmission and the one or more other PUSCH transmissions include at least one of:
different PUSCH transmissions carrying different transport blocks,
different repetitions of a particular PUSCH transmission, or
a combination thereof.

15. The UE of claim 1, wherein the processor-readable code is further configured to cause the UE to transmit an indication of a capability of the UE to support transmission of the coherence indication for the DMRS bundling; and
wherein the processor-readable code, that causes the UE to transmit the UCI, is configured to cause the UE to transmit the UCI based at least in part on the indication of the capability of the UE to support transmission of the coherence indication for the DMRS bundling.

16. The UE of claim 1, wherein the processor-readable code is further configured to cause the UE to receive an instruction to transmit the coherence indication for the DMRS bundling; and
wherein the processor-readable code, that causes the UE to transmit the UCI, is configured to cause the UE to transmit the UCI based at least in part on the instruction to transmit the coherence indication for the DMRS bundling.

17. A method of wireless communication performed by a user equipment (UE), comprising:
receiving a configuration that indicates to the UE to apply demodulation reference signal (DMRS) bundling to physical uplink shared channel (PUSCH) transmissions, wherein the UE maintains phase coherence across multiple PUSCH transmissions, to which the DMRS bundling is applied, to enable joint channel estimation across the multiple PUSCH transmissions; and
transmitting, based at least in part on the configuration, uplink control information (UCI) that includes a coherence indication, wherein the UCI is multiplexed with a PUSCH transmission of the multiple PUSCH transmissions to which the DMRS bundling is applied, and wherein the coherence indication indicates whether the PUSCH transmission is coherent with one or more other PUSCH transmissions, of the multiple PUSCH transmissions, transmitted by the UE.

18. The method of claim 17, wherein the one or more other PUSCH transmissions include a single PUSCH transmission that immediately precedes the PUSCH transmission, and wherein the coherence indication indicates whether the PUSCH transmission is coherent with the single PUSCH transmission that immediately precedes the PUSCH transmission.

19. The method of claim 17, wherein the one or more other PUSCH transmissions include a single PUSCH transmission that immediately follows the PUSCH transmission, and wherein the coherence indication indicates whether the PUSCH transmission is coherent with the single PUSCH transmission that immediately follows the PUSCH transmission.

20. The method of claim 17, wherein the one or more other PUSCH transmissions occur in a time window, and wherein the coherence indication indicates whether the PUSCH transmission is coherent with all of the one or more other PUSCH transmissions that occur in the time window.

21. The method of claim 17, wherein an absolute value of the coherence indication indicates whether the PUSCH transmission is coherent with the one or more other PUSCH transmissions transmitted by the UE.

22. The method of claim 17, wherein a relative value of the coherence indication, compared to a value of another transmitted coherence indication, indicates whether the PUSCH transmission is coherent with the one or more other PUSCH transmissions transmitted by the UE.

23. A base station for wireless communication, comprising:
at least one processor; and
at least one memory communicatively coupled with the at least one processor and storing processor-readable code that, when executed by the at least one processor, is configured to cause the base station to:
transmit a configuration that indicates to a user equipment (UE) to apply demodulation reference signal (DMRS) bundling to physical uplink shared channel (PUSCH) transmissions, wherein the UE maintains phase coherence across multiple PUSCH transmissions, to which the DMRS bundling is applied, to enable joint channel estimation by the base station across the multiple PUSCH transmissions; and receive, based at least in part on the configuration, uplink control information (UCI) that includes a coherence indication, wherein the UCI is multiplexed with a PUSCH transmission of the multiple PUSCH transmissions to which the DMRS bundling is applied, and wherein the coherence indication indicates whether the PUSCH transmission is coherent with one or more other PUSCH transmissions, of the multiple PUSCH transmissions, transmitted by the UE.

24. The base station of claim 23, wherein the processor-readable code is further configured to cause the base station to perform joint channel estimation for the PUSCH transmission and the one or more other PUSCH transmissions based at least in part on the coherence indication.

25. The base station of claim 23, wherein the processor-readable code is further configured to cause the base station to perform separate channel estimation for the PUSCH transmission based at least in part on the coherence indication.

26. The base station of claim 23, wherein the processor-readable code is further configured to cause the base station to determine whether to perform joint channel estimation or separate channel estimation for the PUSCH transmission based at least in part on the coherence indication.

27. The base station of claim 23, wherein the one or more other PUSCH transmissions include a single PUSCH transmission that immediately precedes the PUSCH transmission, and wherein the coherence indication indicates whether the PUSCH transmission is coherent with the single PUSCH transmission that immediately precedes the PUSCH transmission.

28. The base station of claim 23, wherein the one or more other PUSCH transmissions include a single PUSCH transmission that immediately follows the PUSCH transmission, and wherein the coherence indication indicates whether the PUSCH transmission is coherent with the single PUSCH transmission that immediately follows the PUSCH transmission.

29. The base station of claim 23, wherein the one or more other PUSCH transmissions occur in a time window, and wherein the coherence indication indicates whether the PUSCH transmission is coherent with all of the one or more other PUSCH transmissions that occur in the time window.

30. A method of wireless communication performed by a base station, comprising:

transmitting a configuration that indicates to a user equipment (UE) to apply demodulation reference signal (DMRS) bundling to physical uplink shared channel (PUSCH) transmissions, wherein the UE maintains phase coherence across multiple PUSCH transmissions, to which the DMRS bundling is applied, to enable joint channel estimation by the base station across the multiple PUSCH transmissions; and receiving, based at least in part on the configuration, uplink control information (UCI) that includes a coherence indication, wherein the UCI is multiplexed with a PUSCH transmission of the multiple PUSCH transmissions to which the DMRS bundling is applied, and wherein the coherence indication indicates whether the PUSCH transmission is coherent with one or more other PUSCH transmissions, of the multiple PUSCH transmissions, transmitted by the UE.

* * * * *